(12) United States Patent
Longbotham et al.

(10) Patent No.: US 9,729,767 B2
(45) Date of Patent: Aug. 8, 2017

(54) INFRARED VIDEO DISPLAY EYEWEAR

(71) Applicants: SEIKO EPSON CORPORATION, Tokyo (JP); Brian C. Longbotham, Thousand Oaks, CA (US)

(72) Inventors: Brian C. Longbotham, Thousand Oaks, CA (US); Judith Bain, Palos Verdes Estates, CA (US)

(73) Assignees: SEIKO EPSON CORPORATION, Tokyo (JP); Brian C. Longbotham, Thousand Oaks, CA (US)

( * ) Notice: Subject to any disclaimer, the term of this patent is extended or adjusted under 35 U.S.C. 154(b) by 165 days.

(21) Appl. No.: 14/221,715

(22) Filed: Mar. 21, 2014

(65) Prior Publication Data

US 2016/0050345 A1 Feb. 18, 2016

Related U.S. Application Data

(60) Provisional application No. 61/804,458, filed on Mar. 22, 2013.

(51) Int. Cl.
*H04N 13/00* (2006.01)
*H04N 15/00* (2006.01)
(Continued)

(52) U.S. Cl.
CPC ......... *H04N 5/2252* (2013.01); *G02B 23/125* (2013.01); *G02B 27/017* (2013.01);
(Continued)

(58) Field of Classification Search
CPC ........ H04N 13/00; H04N 15/00; H04N 13/04; H04N 9/47; H04N 5/30; H04N 5/335
(Continued)

(56) References Cited

U.S. PATENT DOCUMENTS 4,468,101 A 8/1984 Ellis
4,516,157 A * 5/1985 Campbell .............. G02C 11/00
348/158
(Continued)

FOREIGN PATENT DOCUMENTS

CN 2491854 Y 5/2002
CN 1967309 A 5/2007
(Continued)

OTHER PUBLICATIONS

Mar. 17, 2015 International Search Report issued in International Application No. PCT/US2014/031481.
(Continued)

*Primary Examiner* — Daquan Zhao
(74) *Attorney, Agent, or Firm* — Oliff PLC

(57) ABSTRACT

A wearable display apparatus for viewing video images of scenes and/or objects illuminated with infrared light, the display apparatus including a transparent display that is positioned in a user's field of vision when the display apparatus is worn, a stereoscopic video camera device including at least two cameras that each capture reflected infrared light images of a surrounding environment and a projection system that receives the infrared light images from the stereoscopic camera device, and simultaneously projects (i) a first infrared-illuminated video image in real-time onto a left eye viewport portion of the transparent display that overlaps a user's left eye field of vision and (ii) a second infrared-illuminated video image in real-time onto a right eye viewport portion of the transparent display that overlaps a user's right eye field of vision.

44 Claims, 19 Drawing Sheets

(51) Int. Cl.
*H04N 13/04* (2006.01)
*H04N 5/225* (2006.01)
*G02B 23/12* (2006.01)
*H04N 5/33* (2006.01)
*H04N 13/02* (2006.01)
*G02B 27/01* (2006.01)
*H04N 9/47* (2006.01)
*H04N 5/30* (2006.01)
*H04N 5/335* (2011.01)

(52) U.S. Cl.
CPC ............ *G02B 27/0172* (2013.01); *H04N 5/33* (2013.01); *H04N 13/0239* (2013.01); *H04N 13/0253* (2013.01); *H04N 13/044* (2013.01); *G02B 2027/0127* (2013.01); *G02B 2027/0134* (2013.01); *G02B 2027/0138* (2013.01); *G02B 2027/0154* (2013.01); *H04N 13/0246* (2013.01)

(58) Field of Classification Search
USPC ...... 348/42, 51, 52, 53, 54, 56, 59, 61, 162, 348/164
See application file for complete search history.

(56) References Cited

U.S. PATENT DOCUMENTS

| | | | |
|---|---|---|---|
| 4,563,061 A | 1/1986 | Ellis | |
| 4,707,595 A | 11/1987 | Meyers | |
| 4,755,664 A | 7/1988 | Holmes et al. | |
| 4,761,056 A | 8/1988 | Evans et al. | |
| 4,775,217 A | 10/1988 | Ellis | |
| 4,859,030 A | 8/1989 | Rotier | |
| 4,961,626 A | 10/1990 | Fournier, Jr. et al. | |
| 4,969,714 A | 11/1990 | Fournier, Jr. et al. | |
| RE33,572 E | 4/1991 | Meyers | |
| 5,175,616 A * | 12/1992 | Milgram ................ G03B 35/08 348/47 |
| 5,305,124 A | 4/1994 | Chern et al. | |
| 5,459,612 A | 10/1995 | Ingleton | |
| 5,619,036 A | 4/1997 | Salvio et al. | |
| 5,629,807 A | 5/1997 | Hall | |
| 5,726,671 A | 3/1998 | Ansley et al. | |
| 5,739,797 A | 4/1998 | Karasawa et al. | |
| 5,742,434 A | 4/1998 | Carmeli | |
| 5,815,126 A | 9/1998 | Fan et al. | |
| 5,822,127 A | 10/1998 | Chen et al. | |
| 6,023,372 A | 2/2000 | Spitzer et al. | |
| 6,072,565 A | 6/2000 | Porter | |
| 6,088,165 A | 7/2000 | Janeczko et al. | |
| 6,091,546 A * | 7/2000 | Spitzer ................. G02B 27/017 345/8 |
| 6,094,304 A | 7/2000 | Wallace et al. | |
| 6,121,601 A | 9/2000 | Afsenius | |
| 6,196,845 B1 | 3/2001 | Streid | |
| 6,198,090 B1 | 3/2001 | Iosue | |
| 6,204,974 B1 | 3/2001 | Spitzer | |
| 6,304,386 B1 | 10/2001 | Potin | |
| 6,342,872 B1 | 1/2002 | Potin et al. | |
| 6,349,001 B1 | 2/2002 | Spitzer | |
| 6,356,392 B1 | 3/2002 | Spitzer | |
| 6,369,941 B2 | 4/2002 | Zadravec | |
| 6,384,982 B1 | 5/2002 | Spitzer | |
| 6,421,031 B1 | 7/2002 | Ronzani et al. | |
| 6,424,321 B1 | 7/2002 | Ronzani et al. | |
| 6,448,944 B2 | 9/2002 | Ronzani et al. | |
| 6,452,572 B1 | 9/2002 | Fan et al. | |
| 6,483,647 B2 | 11/2002 | Zadravec | |
| 6,560,029 B1 | 5/2003 | Dobbie et al. | |
| 6,683,584 B2 | 1/2004 | Ronzani et al. | |
| 6,701,535 B2 | 3/2004 | Dobbie et al. | |
| 6,747,802 B2 | 6/2004 | Bignolles et al. | |
| 6,762,884 B2 | 7/2004 | Beystrum et al. | |
| 6,813,086 B2 | 11/2004 | Bignolles et al. | |
| 6,931,668 B2 | 8/2005 | Dobbie et al. | |
| 6,954,315 B2 | 10/2005 | Tracy | |
| 6,972,735 B2 | 12/2005 | Hebert | |
| 6,992,275 B1 | 1/2006 | Knapp | |
| 7,072,107 B2 | 7/2006 | Filipovich et al. | |
| 7,107,624 B2 | 9/2006 | Dobbie et al. | |
| 7,126,103 B2 | 10/2006 | Michalski et al. | |
| 7,170,057 B2 | 1/2007 | Filipovich et al. | |
| 7,190,389 B1 | 3/2007 | Abe et al. | |
| 7,200,536 B2 | 4/2007 | Wynn | |
| 7,201,483 B2 | 4/2007 | Chung et al. | |
| 7,217,020 B2 | 5/2007 | Finch | |
| 7,245,273 B2 | 7/2007 | Eberl et al. | |
| 7,295,377 B2 | 11/2007 | Edelmann | |
| 7,358,496 B2 | 4/2008 | Fleury et al. | |
| 7,434,963 B2 | 10/2008 | Kaminski et al. | |
| 7,436,568 B1 | 10/2008 | Kuykendall, Jr. | |
| 7,450,311 B2 | 11/2008 | Erchak et al. | |
| 7,477,309 B2 * | 1/2009 | Cuccias ................ H04N 5/2254 348/342 |
| 7,483,208 B2 | 1/2009 | Zadravec | |
| 7,496,293 B2 | 2/2009 | Shamir et al. | |
| 7,510,340 B2 | 3/2009 | Laganas et al. | |
| 7,541,581 B2 | 6/2009 | Reed et al. | |
| 7,648,291 B2 | 1/2010 | Laganas et al. | |
| 7,656,585 B1 | 2/2010 | Powell et al. | |
| 7,663,795 B2 | 2/2010 | Blackham | |
| 7,724,443 B2 | 5/2010 | Amitai | |
| 7,733,464 B2 | 6/2010 | David et al. | |
| 7,746,551 B2 | 6/2010 | Schwartz, II et al. | |
| 7,751,122 B2 | 7/2010 | Amitai | |
| 7,777,960 B2 | 8/2010 | Freeman | |
| 7,800,043 B2 | 9/2010 | Filipovich et al. | |
| 7,813,037 B2 | 10/2010 | Zadravec et al. | |
| 7,813,632 B2 | 10/2010 | Laganas et al. | |
| 7,969,383 B2 | 6/2011 | Eberl et al. | |
| 7,978,415 B2 | 7/2011 | Schoenenberger et al. | |
| 8,009,229 B1 | 8/2011 | Peterson | |
| 8,125,519 B2 | 2/2012 | Haug | |
| 8,164,543 B2 | 4/2012 | Seder et al. | |
| 8,203,502 B1 | 6/2012 | Chi et al. | |
| 8,242,444 B2 | 8/2012 | Willey | |
| 8,253,760 B2 | 8/2012 | Sako et al. | |
| 8,269,159 B2 | 9/2012 | Filipovich et al. | |
| 8,280,238 B2 | 10/2012 | Laganas et al. | |
| 8,348,440 B2 | 1/2013 | Burggraf et al. | |
| 8,400,510 B2 | 3/2013 | O'Rourke | |
| 8,431,881 B2 | 4/2013 | Filipovich et al. | |
| 8,432,614 B2 | 4/2013 | Amitai | |
| 8,564,883 B2 | 10/2013 | Totani et al. | |
| 8,576,491 B2 | 11/2013 | Takagi et al. | |
| 8,587,869 B2 | 11/2013 | Totani et al. | |
| 8,654,445 B2 | 2/2014 | Takagi et al. | |
| 8,662,686 B2 | 3/2014 | Takagi et al. | |
| 2001/0038491 A1 * | 11/2001 | Fergason ............ G02B 27/2228 359/466 |
| 2003/0025792 A1 * | 2/2003 | Eberhard ................ H04N 7/183 348/143 |
| 2006/0098087 A1 | 5/2006 | Brandt et al. | |
| 2006/0098093 A1 | 5/2006 | Hahn et al. | |
| 2006/0215885 A1 * | 9/2006 | Kates .................. A01M 31/002 382/120 |
| 2007/0278406 A1 | 12/2007 | Haug | |
| 2008/0106489 A1 | 5/2008 | Brown et al. | |
| 2008/0180521 A1 | 7/2008 | Ahearn | |
| 2009/0153662 A1 | 6/2009 | Abel et al. | |
| 2009/0189830 A1 | 7/2009 | Deering et al. | |
| 2009/0189974 A1 | 7/2009 | Deering | |
| 2009/0195414 A1 | 8/2009 | Riegel et al. | |
| 2009/0237492 A1 | 9/2009 | Kikinis et al. | |
| 2009/0253104 A1 | 10/2009 | Burggraf et al. | |
| 2010/0066832 A1 | 3/2010 | Nagahara et al. | |
| 2010/0110368 A1 | 5/2010 | Chaum | |
| 2010/0149073 A1 | 6/2010 | Chaum et al. | |
| 2011/0213664 A1 | 9/2011 | Osterhout et al. | |
| 2011/0214082 A1 | 9/2011 | Osterhout et al. | |
| 2011/0221656 A1 | 9/2011 | Haddick et al. | |
| 2011/0241976 A1 | 10/2011 | Boger et al. | |
| 2011/0249014 A1 | 10/2011 | Kolstad et al. | |

(56) References Cited

U.S. PATENT DOCUMENTS

| | | |
|---|---|---|
| 2011/0261204 A1 | 10/2011 | Smith |
| 2012/0002008 A1 | 1/2012 | Valin et al. |
| 2012/0005030 A1 | 1/2012 | Valin et al. |
| 2012/0044461 A1 | 2/2012 | Chang et al. |
| 2012/0098971 A1 | 4/2012 | Hansen et al. |
| 2012/0124655 A1 | 5/2012 | Valin et al. |
| 2012/0136793 A1 | 5/2012 | Valin et al. |
| 2012/0139817 A1 | 6/2012 | Freeman |
| 2012/0257005 A1 | 10/2012 | Browne |
| 2012/0262558 A1 | 10/2012 | Boger et al. |
| 2012/0287639 A1 | 11/2012 | Gaber |
| 2012/0299870 A1 | 11/2012 | Chi et al. |
| 2012/0315603 A1 | 12/2012 | Streid |
| 2012/0317706 A1 | 12/2012 | Lebel et al. |
| 2013/0016033 A1 | 1/2013 | Latta et al. |
| 2013/0043395 A1 | 2/2013 | Jamison |
| 2013/0050836 A1 | 2/2013 | Hall |
| 2013/0088413 A1 | 4/2013 | Raffle et al. |
| 2013/0107371 A1 | 5/2013 | DeVaul |
| 2013/0222214 A1 | 8/2013 | Takeda et al. |
| 2013/0222896 A1 | 8/2013 | Komatsu et al. |
| 2013/0222919 A1 | 8/2013 | Komatsu et al. |
| 2013/0235440 A1 | 9/2013 | Takeda et al. |
| 2014/0118424 A1* | 5/2014 | Young .................. G01J 1/32 345/690 |

FOREIGN PATENT DOCUMENTS

| | | |
|---|---|---|
| CN | 200988460 Y | 12/2007 |
| EP | 0 252 200 A1 | 7/1986 |
| EP | 0 576 160 A1 | 6/1993 |
| EP | 0 766 481 A3 | 9/1996 |
| EP | 1 744 196 B1 | 7/2005 |
| EP | 1569440 A2 | 8/2005 |
| EP | 2 194 418 A1 | 12/2008 |
| EP | 2 199 843 A1 | 12/2008 |
| EP | 2 246 728 A1 | 4/2009 |
| JP | 2000-347128 A | 12/2000 |
| JP | A-2005-032625 | 2/2005 |
| RU | 2 371 744 C1 | 10/2009 |
| WO | WO 96/36898 | 11/1996 |
| WO | WO 97/40413 | 10/1997 |
| WO | WO 97/45760 | 12/1997 |
| WO | WO 01/01185 | 1/2001 |
| WO | WO 03/060590 A2 | 7/2003 |
| WO | 2004/005868 A2 | 1/2004 |
| WO | WO 2005/055616 A1 | 6/2005 |
| WO | WO 96/05533 | 2/2006 |
| WO | WO 2007/093766 A1 | 8/2007 |
| WO | WO 2008/092230 A1 | 8/2008 |
| WO | WO 09/105791 A2 | 8/2009 |
| WO | WO 2010/139984 A1 | 12/2010 |
| WO | WO 2011/124368 A2 | 10/2011 |
| WO | WO 2012/016794 A1 | 2/2012 |
| WO | WO 2012/049617 A1 | 4/2012 |
| WO | WO 2012/052352 A1 | 4/2012 |
| WO | WO 2012/064581 A2 | 5/2012 |
| WO | WO 2013/024277 A1 | 2/2013 |
| WO | WO 2013/036888 A2 | 3/2013 |

OTHER PUBLICATIONS

Mar. 17, 2015 Written Opinion issued in International Application No. PCT/US2014/031481.

Vargas-Martin, Fernando et al. "Augmented-View for Restricted Visual Field: Multiple Device Implementations." Optometry and Vision Science. vol. 79, No. 11, pp. 715-723, published Nov. 2002.

* cited by examiner

INFRARED VIDEO DISPLAY EYEWEAR

CROSS-REFERENCE TO RELATED APPLICATION

This nonprovisional application claims the filing date benefit of U.S. Provisional Application No. 61/804,458, filed Mar. 22, 2013.

BACKGROUND

Unassisted, the human eye can only see a limited portion of the electromagnetic spectrum, i.e., visible white light. Infrared light is invisible to the human eye but is detectable with electronic imaging sensors.

Head mounted night vision devices provide the ability to see in low-light conditions. Many night vision devices that are currently available gather existing low-level ambient light (e.g., from starlight) and then amplify the light through a chemical and electrical process that allows a user to see images in the dark. These night vision devices are typically enclosed systems that only allow the user to see the amplified image, and thus obstruct and limit the user's natural eyesight and field of vision. Also, because these night vision systems are designed for low or no light conditions, the functionality of the night vision devices is limited in brightly illuminated or mixed lighting conditions. Also, existing wearable night vision displays are expensive and can be bulky and cumbersome to wear.

SUMMARY

Embodiments of the invention provide a device that projects infrared-illuminated images onto a transparent display.

Embodiments can include a wearable display apparatus for viewing video images of scenes and/or objects illuminated with infrared light, the display apparatus comprising a transparent display that is positioned in a user's field of vision when the display apparatus is worn, a stereoscopic video camera device including at least two cameras that each capture reflected infrared light images of a surrounding environment and a projection system that receives the infrared light images from the stereoscopic camera device, and projects (i) a first infrared-illuminated video image onto a left eye viewport portion of the transparent display that overlaps a user's left eye field of vision and (ii) projects a second infrared-illuminated video image onto a right eye viewport portion of the transparent display that overlaps a user's right eye field of vision.

Embodiments can further include wearable display glasses for viewing stereoscopic infrared-illuminated video images, the glasses comprising a transparent display that is positioned in a user's field of vision when the display glasses are worn, a left-side frame and a right-side frame that support the transparent display and are respectively positioned over the user's left and right ears when the glasses are worn, an infrared light source that illuminates infrared light to a surrounding environment and a stereoscopic camera device including two cameras that each capture reflected infrared-illuminated video images of the surrounding environment, wherein a convergence/divergence angle between the two cameras is adjustable and a projection system that receives the infrared-illuminated video images from the two cameras, and projects (i) a first infrared-illuminated video image onto a left eye viewport portion of the transparent display that overlaps the user's left eye field of vision and (ii) a second infrared-illuminated video image onto a right eye viewport portion of the transparent display that overlaps the user's right eye field of vision, wherein the projected video images are configured to be perceived as a three-dimensional image.

Embodiments can also include a stereoscopic camera device comprising a housing, a first camera and a second camera, which are each rotatably mounted to the housing and are arranged to capture overlapping video images of a surrounding environment and an adjustment mechanism that adjusts a convergence/divergence line-of-sight angle between the first and second cameras by concurrently rotating the first camera about a first axis and rotating the second camera about a second axis that is substantially parallel to the first axis.

Additionally, embodiments can include a clip-on camera assembly that is configured to attach a camera device to wearable display glasses, the clip-on camera assembly comprising a camera assembly including a housing and a camera that is mounted to the housing and a clipping structure that is mounted to the housing and allows the housing to be secured to the display glasses by clipping the camera assembly onto a portion of the display glasses.

Finally, embodiments can include a display system for viewing video images of scenes and/or objects illuminated with infrared light, the display system comprising a wearable display including a transparent display that is positioned in a user's field of vision when the wearable display is worn, an infrared light source that illuminates infrared light to a surrounding environment, a stereoscopic video camera device including at least two cameras that each capture reflected infrared-illuminated video images of the surrounding environment and a projection system mounted to the wearable display that receives the infrared-illuminated video image from the stereoscopic camera device, and projects (i) a first infrared-illuminated video image onto a left eye viewport portion of the transparent display that overlaps the user's left eye field of vision and (ii) a second infrared-illuminated video image onto a right eye viewport portion of the transparent display that overlaps the user's right eye field of vision.

BRIEF DESCRIPTION OF THE DRAWINGS

The foregoing and other objects, features, aspects and advantages of the invention will become more apparent from the following detailed description when taken in conjunction with the following accompanying drawings.

FIG. 5A illustrates an image seen by the user when the night vision image is not projected on the transparent display, and FIG. 5B illustrates the image seen by the user when the night vision image is projected on the transparent display. FIGS. 5C and 5D illustrate similar scenes demonstrating operation of the infrared video display glasses in daylight.

DETAILED DESCRIPTION OF THE EMBODIMENTS

Embodiments of the invention are described below with reference to FIGS. 1-21.

Embodiments of the invention include a head-wearable video display device that can project an infrared illuminated image onto a transparent display. This can allow the user to see images in dark or low-light conditions. The term "night vision" as sometimes used herein, refers to the enhanced ability to see images of scenes and/or objects in reduced-lighting environments, and is not intended to only refer to night or even dark conditions. Indeed, one advantage that can be achieved by the transparent video display eyewear is the ability to clearly see images in a variety of lighting conditions, e.g., from environments having a complete absence of light to dusk-like conditions where the ambient light is only somewhat reduced.

Embodiments of the invention can be used in various applications. The video display device can be useful in professions such as, for example, police officers, firefighters, military personnel and search and rescue personnel. Industries where the video display device can be used can include, for example, manufacturing and inspection, mining, medical, construction, oil and gas, building, home inspection and maintenance, equipment inspection and maintenance, maritime, security and various outdoor activities.

Figure 1:
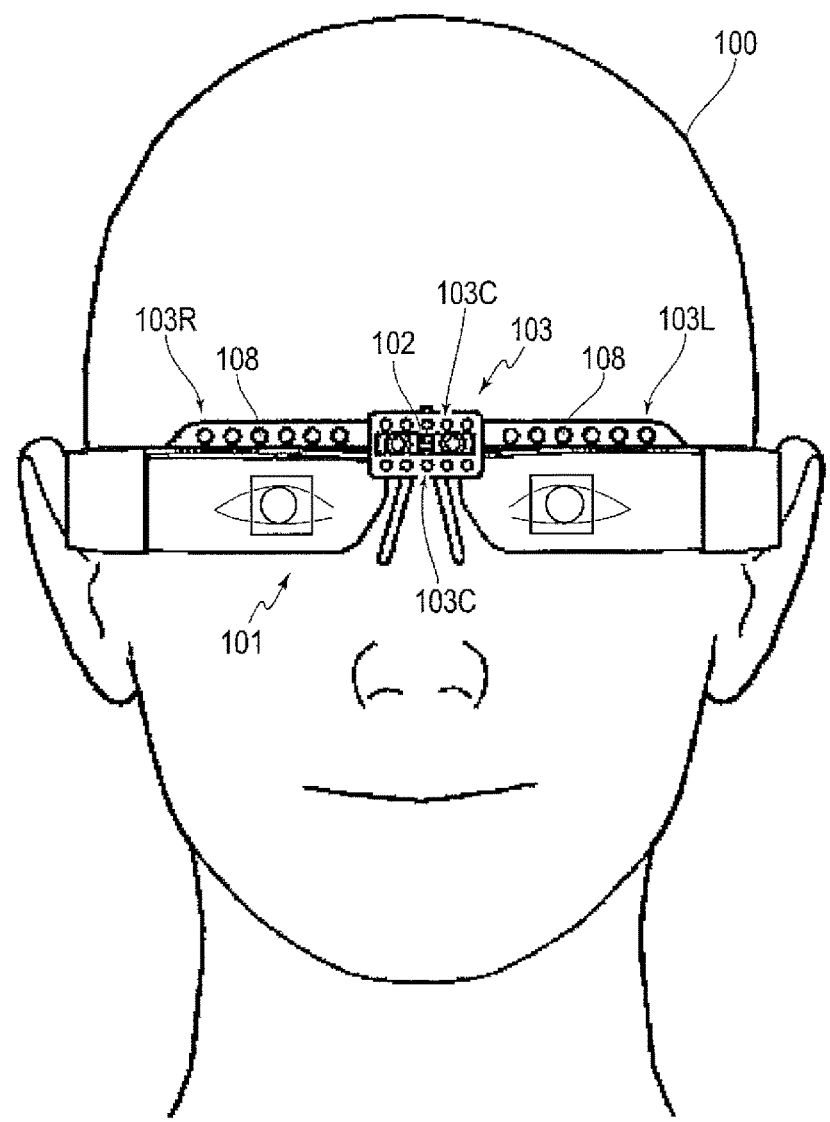
FIG. 1 is a front-view of a user wearing infrared video display glasses according to one embodiment.

FIG. 1 illustrates a user 100 wearing one embodiment of the transparent stereoscopic video display glasses 101. The stereoscopic system of the video display glasses 101 can include a miniature infrared stereoscopic camera device 102 and an infrared illumination system 103 that are mounted on the eyewear. The stereoscopic camera device 102 can be mounted in a center region of the video display glasses 101, e.g., approximately centered on the user's nose, so that the images taken by cameras of the camera device 102 approximate the perspective of the user's normal vision. The infrared illumination system 103 can include a center illumination array 103C that is mounted around the camera device 102, a left-side infrared illumination light bar 103L that is mounted on the video display glasses 101 above the user's left eye, and a right-side infrared illumination light bar 103R that is mounted on the video display glasses 101 above the user's right eye. Each of the illumination arrays 103C, 103L, 103R can include a plurality of high-intensity infrared LED illuminators 108.

The video display glasses 101 can be sized for an average adult. An interocular separation is the distance between the centers of each of the human eyes of a person. The interocular separation for a typical adult (male) is generally known to be approximately 65 mm. The video display glasses 101 can be modified for use according to a wide range of interocular distances between 30 mm to 90 mm, for example, and between 55 mm and 75 mm.

The camera device 102 can include two center illumination arrays 103C of five infrared illumination LEDs 108. The infrared illumination light bars 103L, 103R each can include a linear array of six LEDs. Each of the arrays can include more or fewer LEDs depending on the desired viewing range, and the arrays can be arranged differently depending on the shape of the video display glasses 101, the size and shape of the LEDs, etc. In an alternate configuration, the light bars 103R, 103L can be positioned on the top of the video display glasses frame above the user's eyes and separate light bars can be positioned on the bottom of the video display glasses frame below the user's eyes. In this manner, two eyeglass lenses 101G of the video display glasses 101 can be partially encircled by infrared illumination LEDs 108. Such a configuration can provide more infrared illumination LEDs 108 which can result in an even higher viewing range of the camera device 102.

Figure 2:
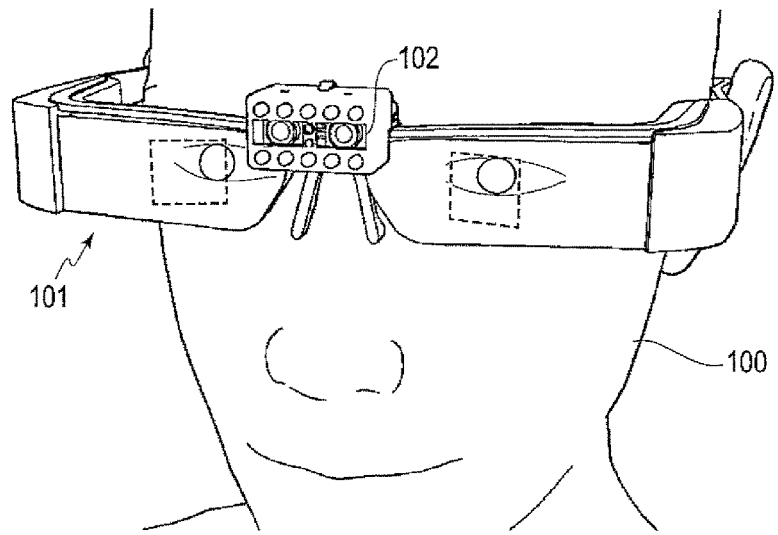
FIG. 2 is a perspective view of a user wearing infrared video display glasses according to another embodiment.

FIG. 2 shows a user wearing the video display glasses 101 without the illumination light bars 103L, 103R. The amount and type of infrared illumination can vary depending on the desired view range. For example, the viewing range of the video display glasses 101 without the light bars 103L, 103R can be approximately, for example, 25-40 feet depending on the quality and intensity of the infrared LEDs. On the other hand, the viewing range of the video display glasses 101 with the light bars 103L, 103R can be approximately, for example, 75 feet or more. In some aspects, depending on the desired range and the intensity of the LEDs, the infrared illumination system 103 can include a number of LEDs in the ranges of 2-20, 5-15, 10-50, 15-30, 20-25, 30-100, 40-80, and 50-60 feet, for example.

Any suitable infrared LEDs 108 can be used. Commercially available high-intensity LEDs can be used. Preferably, the LEDs can have an intensity in the range of 15-500 mW, for example, and can emit light within the wavelengths of 730 nm to 950 nm, for example.

Figure 3:
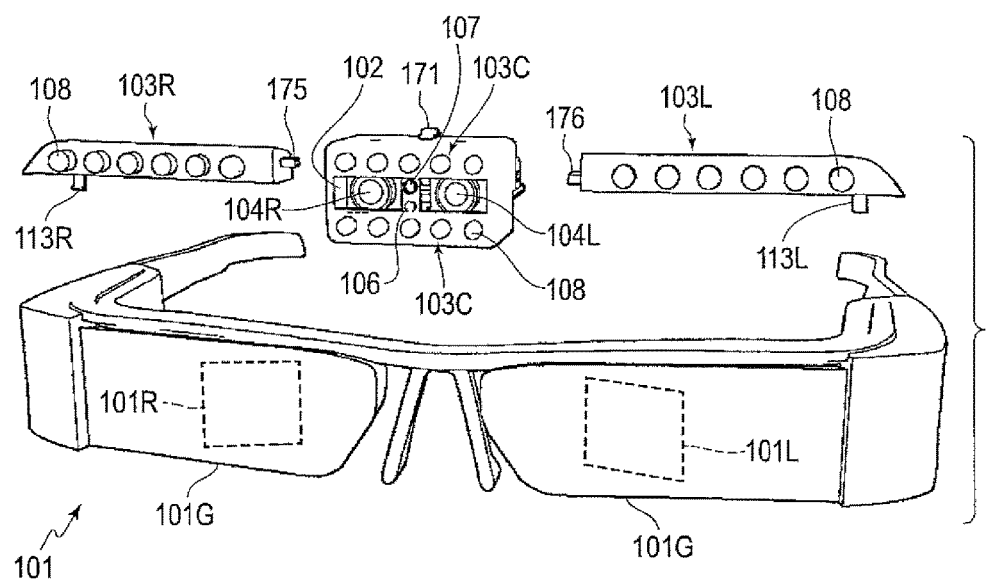
FIG. 3 is an exploded view showing an embodiment of the transparent video display glasses.

FIG. 3 illustrates an exploded view of the transparent video display glasses 101. The video display glasses 101 can include two transparent eyeglass lenses 101G, which can include a left and right transparent video image display viewports 101L, 101R where the images captured by the camera device 102 are projected onto the lenses 101G. Preferably, the two eyeglass lenses 101G are transparent, and thus the projection display that the user sees is transparent. The eyeglass lenses 101G can optionally be transparent prescription lenses. Viewports 101L, 101R can be centrally located within each of the two eyeglass lenses 101G located to oppose the user's eyes, and can occupy, e.g., from 10-60%, or 25-50%, of the area of the lenses 101G. Centrally located viewports 101L, 101R on each of the two eyeglass lenses 101G advantageously allow the user to see the surrounding environment at all locations around the viewports 101L, 101R. The viewport prisms 101L, 101R can also be transparent.

The video display glasses 101 can include the camera device 102. In some embodiments, the camera device 102 can be configured to capture images that appear stereoscopic (three-dimensional) when projected onto the viewports 101L, 101R. The camera device 102 can include two interchangeable high definition digital video camera sensor modules 104L, 104R located symmetrically on opposite sides of a centerline of the camera device 102. The two video camera sensor modules 104L, 104R can be preferably spaced near each other with respective image view ranges that partially overlap. In this configuration, the user sees a stereoscopic image because the image captured by the video camera sensor module 104L is projected onto viewport 101L and is configured to be viewed by the user's left eye, and concurrently, the image captured by the video camera sensor module 104R is projected onto viewport 101R and is configured to be viewed by the user's right eye.

The two video camera sensor modules 104L, 104R can specifically be positioned with respect to each other based on an interaxial distance. The interaxial distance is the distance between the centers of the camera lenses of each of the video camera sensor modules 104L, 104R. The interaxial distance between the video camera sensor modules 104L, 104R can range between 5 mm and 70 mm, or 10 mm to 30 mm. Preferably, the interaxial distance is approximately 16 mm. Adjusting the interaxial distance can provide various settings for more or less pronounced stereoscopic three dimensional viewing effects by the video display glasses 101.

In these embodiments, the lateral angular position of the video camera sensor modules 104L, 104R can be controlled by a finger gear wheel 171. The finger gear wheel 171 can be turned to adjust the convergence angle of the two video camera sensor modules 104L, 104R. By using the finger gear wheel 171, the user 100 can manually adjust the angle between the two video camera sensor modules 104L, 104R.

This configuration can provide several advantages. Using two video camera sensor modules 104L, 104R for each eye can provide an image that the user sees with more depth perception than a single-source image. The viewing angle between the two video camera sensor modules 104L, 104R can be adjusted to alter the cameras' convergence and divergence which can provide an improved three-dimensional depth effect. The overlapped image can provide further image clarity. Additionally, the finger gear wheel 171 can advantageously allow the user 100 to calibrate the three-dimensional effect of the image based on the user's vision. The ability to adjust the convergence angle can also change the focal point of the projected images so that images at different distances can be optimally viewed, e.g., closer objects can be seen more clearly when the cameras are relatively more convergent and farther objects can be seen more clearly when the cameras are relatively more divergent.

The video camera sensor modules 104L, 104R can take video images in different lighting conditions and can preferably detect infrared light. The video images can be captured and optionally recorded by the video camera sensor modules 104L, 104R. The captured video images can be of high definition and/or digital quality. Suitable camera sensors can include, for example, generic complementary metal-oxide semiconductor (CMOS) image sensors and charge-coupled device (CCD) image sensors. An additional suitable camera sensor can include, for example, an LWIR module, including an FLIR Systems, Inc. product described as LEPTON Longwave thermal imaging, which has an infrared wavelength from 8 to 14 µm. Accordingly, the combination of the CMOS image sensors, CCD image sensors and the LWIR module can provide the user with simultaneous digital video viewing across white light, ultraviolet light, active infrared light and thermal infrared light spectrums.

The front surface of the camera device 102 can include a microphone 106 and a light sensor 107. The microphone 106 can receive audio data from the environment, record and store the audio data in a memory. This feature can advantageously record and store audio data and correlate the audio data to the specific portion of the video data received by the video camera sensor modules 104L, 104R for analysis or recording purposes.

The light sensor 107 can be used to activate the infrared illumination LEDs 108 based on the light intensity of the environment. Specifically, the light sensor 107 can activate the infrared illumination LEDs 108 when low light conditions are detected. This feature can efficiently use energy by permitting the infrared illumination LEDs 108 to advantageously operate only when environmental conditions require such use. Likewise, the light sensor 107 can activate a certain number of the infrared illumination LEDs 108 based on different lighting conditions such as dawn, dusk and nighttime. Thus, only the necessary infrared illumination LEDs 108 can be activated by the light sensor 107 to operate. Accordingly, an infrared illuminated area can be seen by the user 100 within the range specified by the number of infrared illumination LEDs 108 used. Alternatively, the LEDs 108 can be activated manually by the user regardless of the amount of ambient light sensed by light sensor 107. In another embodiment, all the LEDs 108 can be immediately activated, or activated after a specific time, upon receiving a command from the light sensor 107.

The light bars 103L, 103R can be attached to the camera device 102 at opposite sides. The infrared LED illuminators 108 on the light bars 103L, 103R can be of a higher intensity than the infrared illumination LEDs 108 that are attached to the camera device 102. The higher intensity can provide an increased viewing range of the camera device 102. The light bars 103R, 103L can be mechanically and electrically fastened to the camera device 102 through an infrared LED light bar power connector 175 and an audio/video/power/data port pass-through connector 176. The light bar power connector 175 can engage a data port 240 (FIG. 12) at a side surface of the camera device 102. This connection can provide power for the light bar 103R to operate. Specifically, based on the light intensity of the environment, the light sensor 107 of the camera device 102 can activate a certain number of infrared LED illuminators 108 of the light bar 103R.

Figure 4:
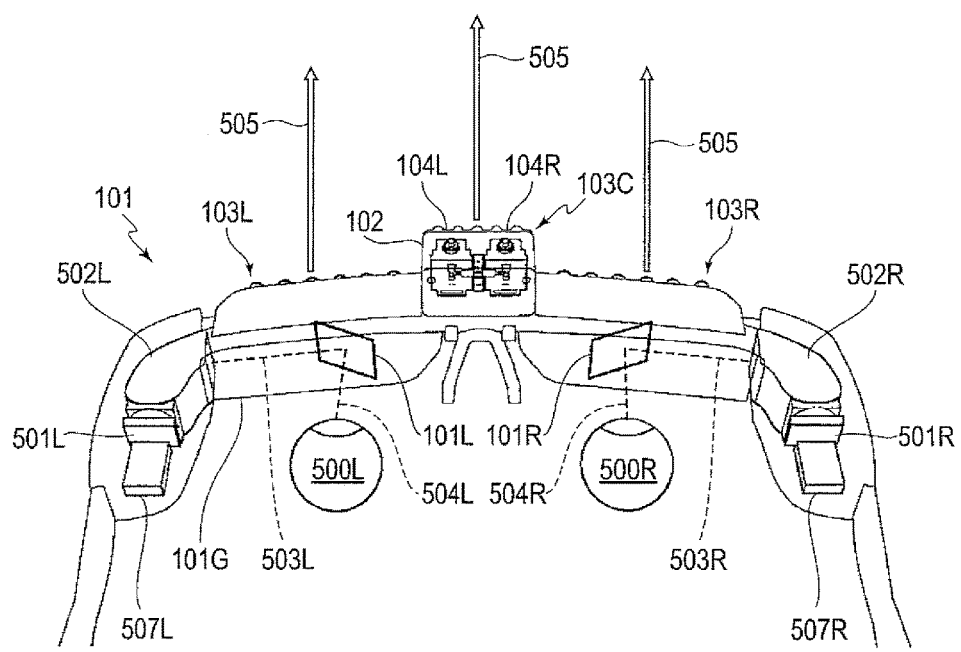
FIG. 4 is a cut-away rear view illustrating the operation of the video display glasses.

The data port pass-through connector 176 of the light bar 103L can connect to a data port 186 (FIG. 6) in the camera device 102. This connection can similarly provide power for the light bar 103L to operate. The data port pass-through connector 176 can act as a communicator of audio data and video data between the camera device 102 and image focus system 502R, 502L (FIG. 4). The image focus system 502R, 502L can be located at each side of the frame of the video display glasses 101 and can project the image in the viewports 101L, 101R of the video display glasses 101 for the user 100 to see. More details regarding the image focus system 502R, 502L are discussed in detail below in connection with FIG. 4.

The camera device 102 and the infrared illumination light bars 103L, 103R can be fastened by a clip-on to the top surface of the frame of the video display glasses 101. The clip-on frame supports 113L, 113R for the light illumination bars can be J-shaped plastic members that are configured to clip onto the eyewear frame. The clip-on frame support 113L, 113R can be located at a bottom surface of each of the light bars 103R, 103L and can be positioned away from the camera device 102, near the end of the light bars 103R, 103L. Positioning the clip-on support 113L, 113R near the end of the light bars 103R, 103L away from the camera device 102 can provide added stability to the video display glasses 101. The clip-on frame support 113L, 113R can elastically deform when attaching to the frame of the video display glasses 101 to advantageously provide a secure fit between the illumination light bars 103L, 103R and the frame of the video display glasses 101.

FIG. 4 illustrates the operation of the video display glasses 101. Suitable video display glasses include the Moverio head mounted display (Seiko Epson Corporation). Specifically, the camera device 102 and the infrared light arrays 103C, 103R, 103L and can cooperate together in a forward facing orientation 505 to illuminate lowlight conditions and detect reflected infrared light and reflected visible light. Real-time video images can be captured by the video camera sensor modules 104L, 104R. Each of the respective real-time video images can be transmitted, preferably in real-time, to respective high-resolution micro video displays 501L, 501R through internal wiring in the video display glasses 101. Preferably, the real-time video images can be transferred directly to the high-resolution micro video display 501L, 501R. The high-resolution micro video display 501L, 501R can also operate with a video processing and display electronics 507L, 507R to analyze and process the real-time video images into a stereoscopic display format. The high-resolution micro video display 501R, 501L and the video processing and display electronics 507L, 507R can be located on respective side frames of the video display glasses 101.

Optical image focus systems 502L, 502R can be provided at the corners of the front frame and the respective side frames of the video display glasses 101. An optical assembly inside the optical image focus system 502L, 502R can provide a close-up view and/or an improved resolution of the stereoscopic real-time video images. After the stereoscopic real-time video images are processed, as discussed above, the video images can be simultaneously projected in real-time via aerial video image transmissions 503L, 503R toward the viewports 101L, 101R of the respective eyeglass lenses 101G of the video display glasses 101 for the user to see. The eyes 500R, 500L of the user 100 can now see the stereoscopic real-time video images through a line of sight 504L, 504R directed toward the viewports 101L, 101R which show the projected images. The components and operation of suitable video display glasses are described, for example, in U.S. Pat. Nos. 8,662,686, 8,654,445, 8,587,869, 8,576,491, 8,564,883, and 5,739,797 and U.S. Patent Application Publication Nos. 2013/0222214, 2013/0222896, 2013/0222919 and 2013/0235440, the entireties of which are incorporated herein by reference.

Because the lenses 101G are transparent, the user 100 can also simultaneously see the environment surrounding the stereoscopic real-time video image projected in the viewport prisms 101L, 101R. This can advantageously provide the user 100 the ability to have a full field of vision and see the stereoscopic real-time video image at the same time.

Figure 5A:
FIGS. 5A-5D are views from a user's perspective wearing infrared video display glasses.

FIGS. 5A-5D illustrate exemplary capabilities of the video display glasses 101. FIG. 5A illustrates the perspective of user looking at a house with the video display glasses 101 when the night vision system is turned off. In this scenario, the video display glasses 101 are being used at nighttime with minimal ambient light. This view represents a natural partly illuminated nighttime scene. Although the details of the exterior of the house can be seen in some detail, the specific details inside the house are very difficult to visualize. The user 100 may be able to observe that the door of the house is open but cannot see objects in the interior of the house beyond the doorway.

Figure 5B:
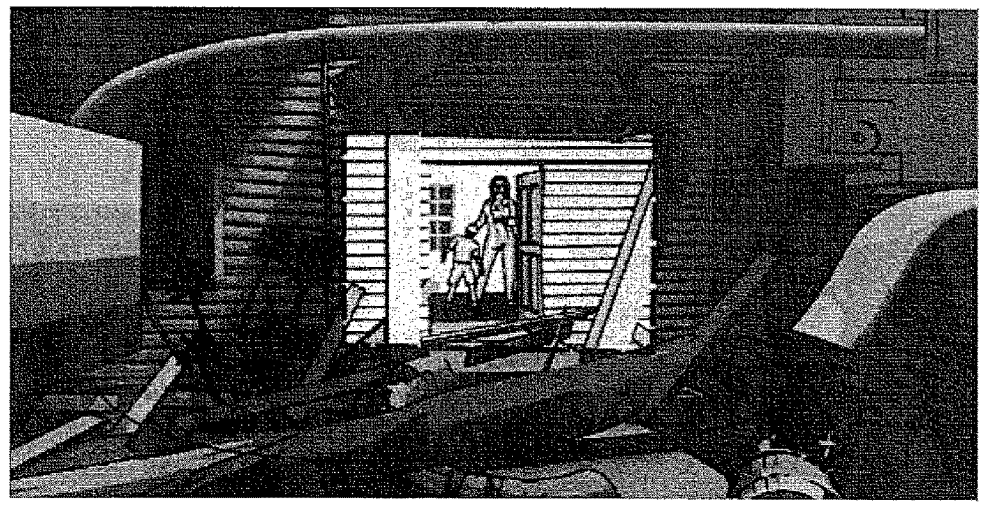

FIG. 5B illustrates the same perspective of the user 100 looking at the same house illustrated in FIG. 5B with the video display glasses 101 when the night vision system is turned on. The night vision system illuminates the interior of the house with infrared light and projects an image of the house onto the transparent viewport, and thus the viewport shows the infrared camera video images. As can be seen, the user 100 can accurately see the details immediately beyond the door and inside the dark house. The user 100 can also simultaneously see the environment surrounding the viewport in a natural or normal condition. This can advantageously provide the user 100 the ability to retain a sense of visual depth perception. FIG. 5B shows that the video display glasses allow the user to view the darkened interior of the house as well as the partially darkened entrance area.

Figure 5C:

FIG. 5C illustrates the user 100 looking at a cave with the video display glasses 101 when the night vision system is turned off. The video display glasses 101 are being used during the day with an abundant amount of ambient light present. This view represents a natural daylight illuminated scene. The details of the exterior of the cave can be clearly seen because of the ambient light. However, the details inside the cave cannot be clearly seen since the ambient light does not enter the enclosed area of the cave.

Figure 5D:
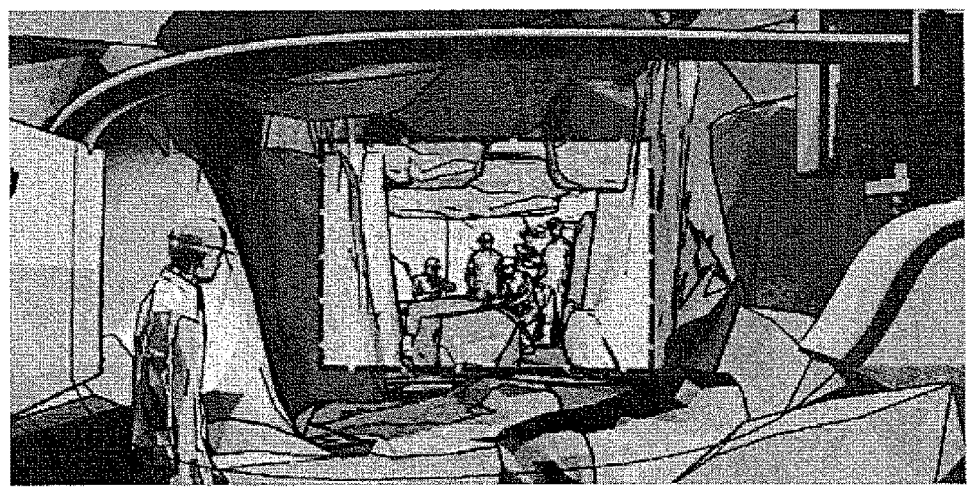

FIG. 5D illustrates the user 100 looking at the same cave illustrated in FIG. 5C with the video display glasses 101 when the night vision system is turned on. The night vision system projects infrared light into the interior of the cave and captures images of infrared-illuminated objects in the interior portion of the cave. The night vision system then projects the infrared video image onto the transparent viewing window of the video display glasses 101. The user 100 can see a group of four people interacting. The user 100 can also simultaneously see the environment surrounding the cave in a natural or normal condition.

FIGS. 5A-5D illustrate the following advantages. The video display glasses 101 can function at night, but also during the day time or in the presence of a more abundant amount of ambient light. Because the real-time video image can be projected onto a transparent display, the real-time video image will appear to be more transparent with greater ambient light and will appear to be less transparent with less ambient light. This can allow the user to substantially view the natural environment in greater lighting conditions and to rely more on the projected image in darker conditions. Moreover, in darker conditions, the user can visually determine depth more accurately. Depth perception that is not compromised at night can allow users, for example, to more safely walk, run, navigate obstacles, reach and touch objects and visually judge their distance with better accuracy. These advantages are not provided by prior art night vision systems and monocular type viewing devices in the dark.

Figure 6:
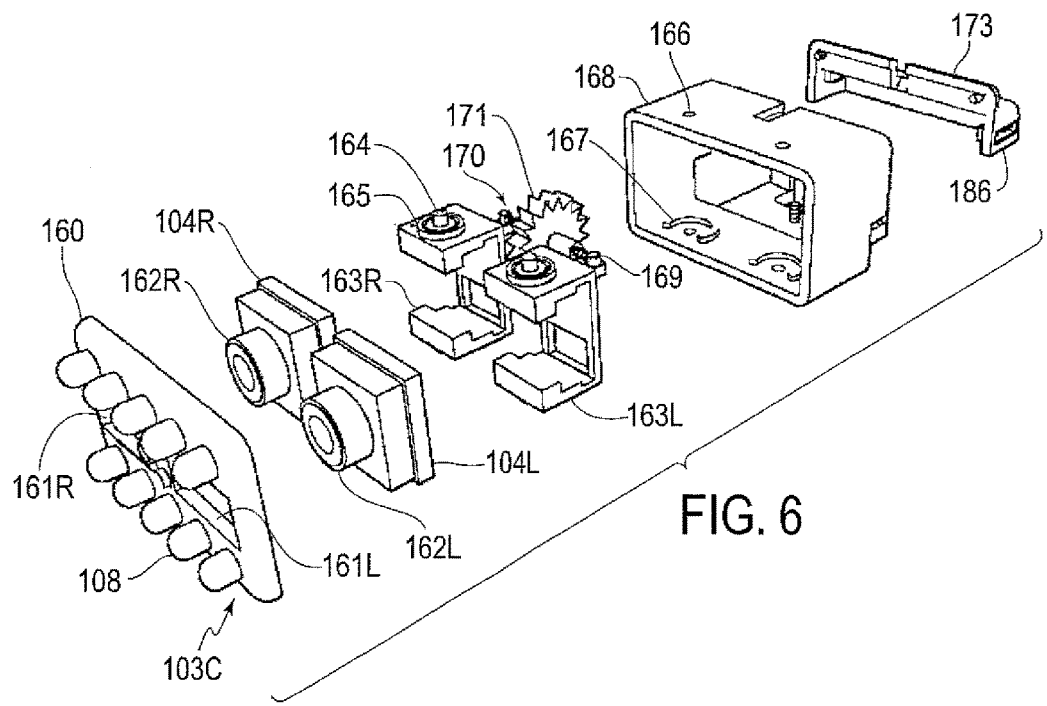
FIG. 6 is an exploded view of the camera and lighting devices.

FIG. 6 is an exploded view of an exemplary embodiment of the camera device 102 that can attach to the light bars 103R, 103L. The camera device 102 can include a front camera case faceplate 160. The front faceplate 160 can act as a front cover to the camera device 102 to enclose, secure and protect the components in the camera device 102. An outside surface of the front faceplate 160 can include the infrared illumination LEDs 108 of the array 103C. The faceplate 160 can also include the microphone 106 and the light sensor 107. The front faceplate 160 can also include at least two openings 161L, 161R for the video camera sensor modules 104L, 104R to capture video data.

The video camera sensor modules 104L, 104R can be located immediately behind an inside surface of the front faceplate 160 and can be aligned with the at least two openings 161L, 161R. The video camera sensor modules 104L, 104R can each include a camera lens 162L, 162R. The video camera sensor modules 104L, 104R and the camera lens 162L, 162R can be interchangeable between the right side and the left side of the camera device 102. The camera lens 162L, 162R can be configured for ultra-low visible light sensitivity, as well as high infrared light sensitivity in an approximate spectral range of 700 to 1100 nanometers. The video camera sensor modules 104L, 104R and the camera lens 162L, 162R can capture and record videos, including high-definition videos. Such a configuration can allow the use of a variety of optics for different fields of view. Additionally, this configuration can allow for the use of other types of imaging sensors including a variety of video-based sensors, thermal based sensors and other types of imaging technologies for stereoscopic vision.

The video camera sensor modules 104L, 104R can be secured inside the camera module support carriages 163L, 163R. The mode of engagement between the video camera sensor modules 104L, 104R and the camera module support carriages 163L, 163R can be a press fit so that the components are clipped together via plastic deformation or a noninterference close fit. The mode of engagement can be dependent on the amount of pressure that the video camera sensor modules 104L, 104R is capable of handling before performance is reduced and the amount of acceptable error due to movement of the video camera sensor modules 104L, 104R in the camera module support carriages 163L, 163R.

Each of the support carriages 163L, 163R can include a pin 164 and bearing 165 system. The outer diameter of the bearings 165 can be press fitted into a bore 185 (see FIG. 8) in the support carriage 163 and the pins 164 can engage the bearings 165 in a noninterference close fit. The pin 164 and bearing 165 systems of the support carriages 163L, 164R can engage with a respective camera bearing guide pin hole 166 and a respective camera carriage bearing support guide 167 located in a camera support housing 168 in a noninterference close fit. The bearing support guide 167 and bore 185 can be a semicircular shape or a substantially circular shape that can provide a press fit for the bearing 165 in the camera support housing 168 and the support carriage 163, respectively.

The pin 164 can be positioned in the bearing 165 so that a center of rotation of the video camera sensor modules 104L, 104R can be positioned approximately at a rear of the optics and at a front edge of the imaging sensor. This configuration allows the video camera sensor modules 104L, 104R to be capable of rotating inside the camera support housing 168, and thus allows optical alignment of the cameras sensor modules 104L, 104R. This configuration further provides for smooth lateral, angular motion when the video camera sensor modules 104L, 104R rotate, and can also provide additional stability during operation of the video display glasses 101.

The rear surface of the camera module support carriages 163L, 163R are connected to a camera carriage turnbuckle connection arm 169 that connects to a turnbuckle 170. The turnbuckle 170 can cooperate with the finger gear wheel 171 to precisely synchronize and rotate the video camera sensor modules 104L, 104R in the camera device 102 and provide stereoscopic vision adjustment. The turnbuckle 170 can include two external threaded portions 170L, 170R, as well as a central body 170C having a corresponding internal thread that engages the two external threaded portions 170L, 170R. As discussed above, the finger gear wheel 171 can be adjusted by the user 100 for vision alignment. The operation of this configuration will be discussed in further detail below.

To assemble the above components of the camera device 102, the support carriages 163L, 164R can be fixed within the camera support housing 168. The front faceplate 160 can be fixed on a front surface of the camera support housing 168 and the rear camera housing 173 can be fixed on a rear surface of the camera support housing 168. The front faceplate 160 and the rear camera housing 173 can be press fit, fastened with fasteners or clipped via plastic deformation to the camera support housing 168. The front faceplate 160 and the rear camera housing 173 can act as a cover to enclose and protect the components in the camera device 102.

An outer side surface of the rear camera housing 173 can include a data port 186. The data port 186 can transmit audio data, video data and power to and from the camera device 102. The data port 186 can be located on one side or on both sides of the rear camera housing 163 and can connect to the light bars 103L, 103R via the data port pass-through connector 176.

Figure 7:
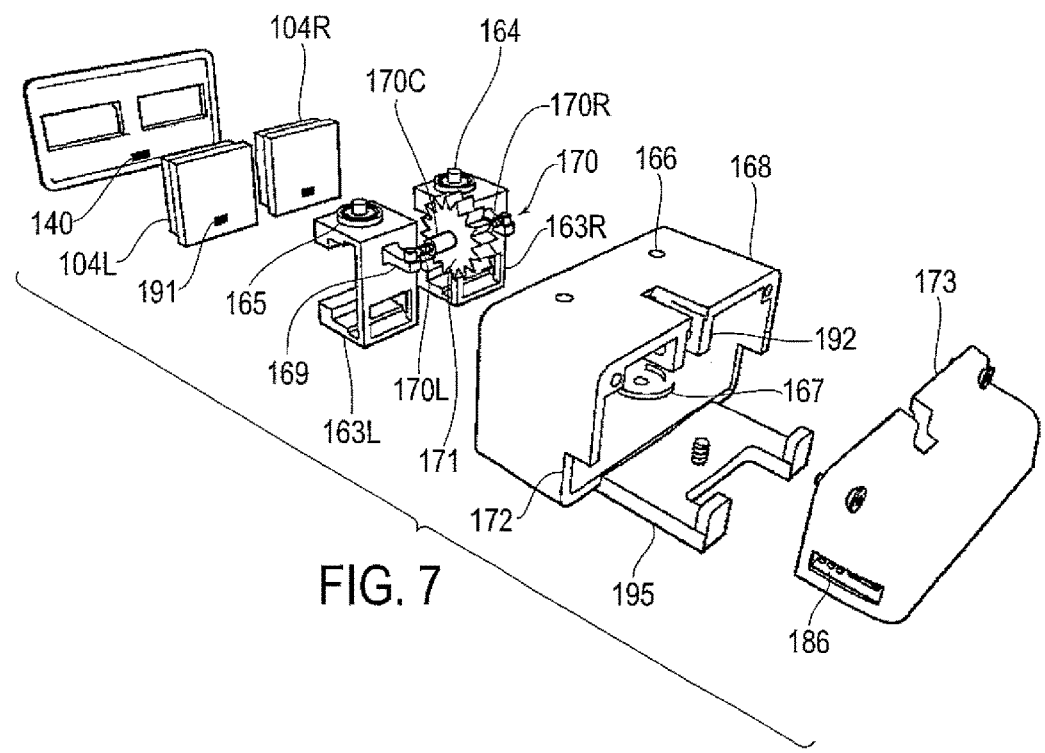
FIG. 7 is an exploded view of the back of the camera and lighting devices of FIG. 6.

FIG. 7 illustrates an exploded rear view of the camera device 102 of FIG. 6. On an inner face of the front faceplate 160 can include a front audio and power connector 140. The audio and power connector 140 can transfer audio data and power between the microphone 106 and light sensor 107 to the camera device 102. The video camera sensor modules 104L, 104R can include a camera sensor module video output and power connector 191. The video output and power connector 191 can transfer video data and power between the video camera sensor modules 104L, 104R and the camera device 102.

The camera support housing 168 can include a support and alignment guide 192 for the turnbuckle 170 and the finger gear wheel 171. The support and alignment guide 192 can be a slot shaped opening in a top surface of the camera support housing 168 to keep the finger gear wheel 171 aligned. Alignment of the finger gear wheel 171 can advantageously avoid undesired axial movement of the finger gear wheel 171. The finger gear wheel 171 should not move axially and can only rotate. If the finger gear wheel 171 moves axially, then the calibration of the video camera sensor modules 104L, 104R may be incorrect. The support and alignment guide 192 can allow the finger gear wheel 171 to extend beyond the top surface of the camera support housing 168. This configuration can advantageously allow the user 100 to access and rotate the finger gear wheel 171. By rotating the finger gear wheel 171, the position of the video camera sensor modules 104L, 104R can be rotated without disassembling the camera device 102.

A camera device clip-on structure 195 can be provided at a bottom surface of the camera support housing 168. The rear camera housing 173 can be smaller in height than the camera support housing 168. Additionally, the camera support housing 168 can include a notch 172 at a rear surface and above the camera device clip-on structure 195. When the rear camera housing 173 is attached to the camera support housing 168, the respective top surfaces can be substantially in-line. Accordingly, the notch 172 in the housing 168 can accommodate the frame 263 of the video display glasses 101. As a result, the camera device clip-on structure 195 of the camera device 102 is capable of being mounted to the video display glasses 101. Further details of this assembly will be discussed below.

Figure 8:
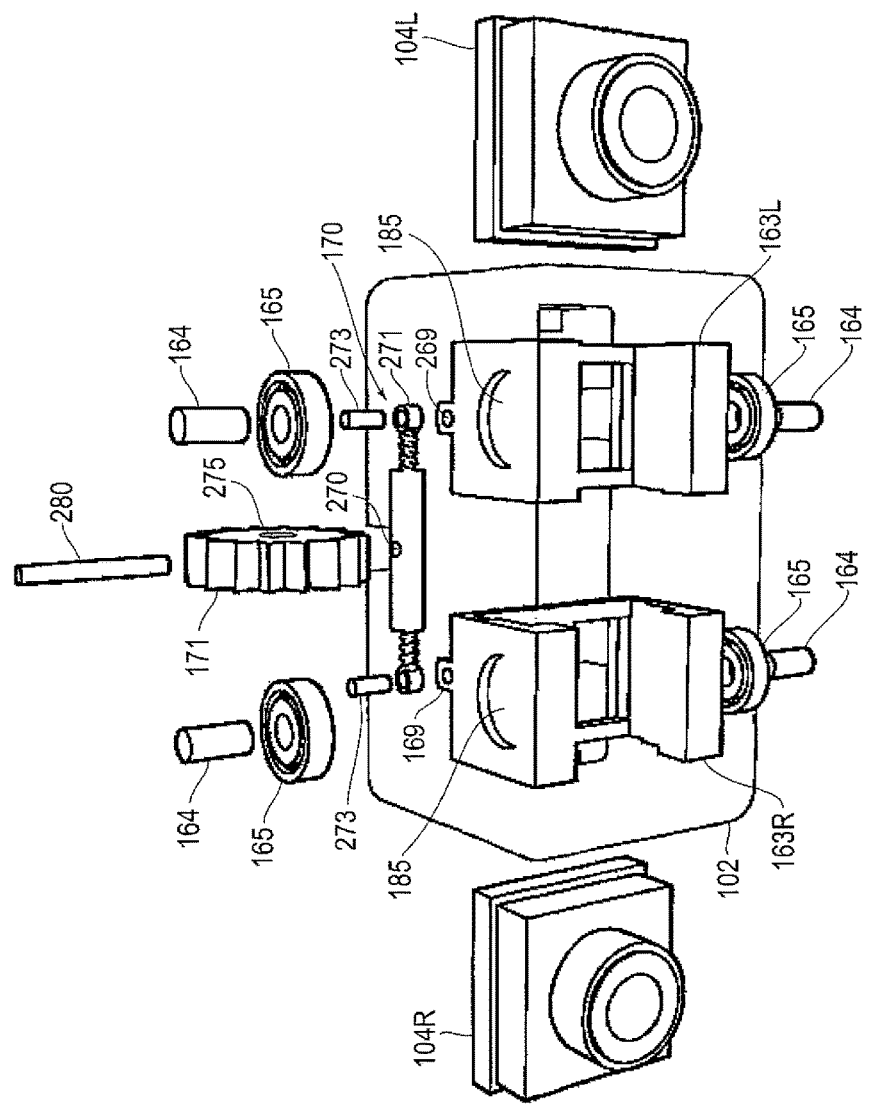
FIG. 8 is an exploded front view of the housing assembly of the camera device.

FIG. 8 is an exploded front view of the assembly in the support housing 168 of the camera device 102. As discussed above, each of the video camera sensor modules 104L, 104R can be positioned within the respective support carriages 163L, 163R. Each of the pin 164 and bearing 165 systems can be assembled on opposing sides of the respective support carriages 163L, 163R. The respective bearings 165 can be press fitted into the bearing support guides 167 (see FIG. 6) of the camera support housing 168 and recessed seats 185 of the support carriages 163R, 163L. Meanwhile, the pins 164 can engage the bearings 165 and the camera support housing 168 in a noninterference close fit. The pins 164 preferably do not engage the support carriages 163R, 163L.

Each end of the turnbuckle 170 includes an eyelet 271 that can be attached to corresponding eyelets 269 on each respective turnbuckle connection arm 169 via a press fitted attachment pin 273. This connection can ensure that the support carriages 163L, 163R accurately rotate based on the axial movement of the thread in the turnbuckle 170. A loose fit between the turnbuckle 170 and the turnbuckle connection arm 169 can create inaccuracies in the camera device 102. As discussed in detail below, the turnbuckle 170 can be threaded at a predetermined pitch.

Preferably, the finger gear wheel 171 can have an axial hole 275 that can mate with the turnbuckle 170. The axial hole 275 of the finger gear wheel 171 can be larger than the circumference of each of the eyelets 271 on the ends of the turnbuckle 170 in the axial direction of the turnbuckle 170. In this manner, the finger gear wheel 171 can slide onto the turnbuckle 170.

Figure 9:
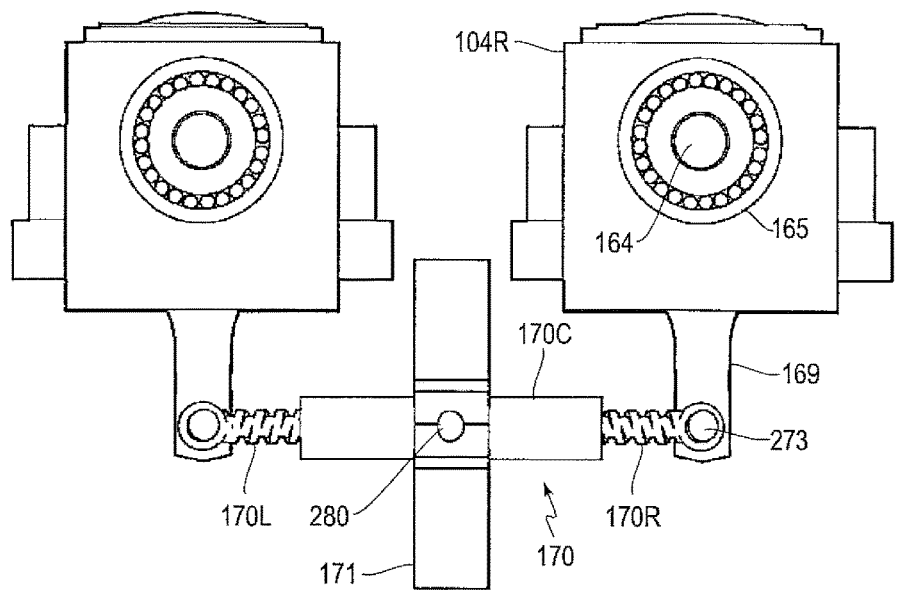
FIG. 9 is a top view of the camera device showing a turnbuckle adjustment mechanism.
Figure 10:
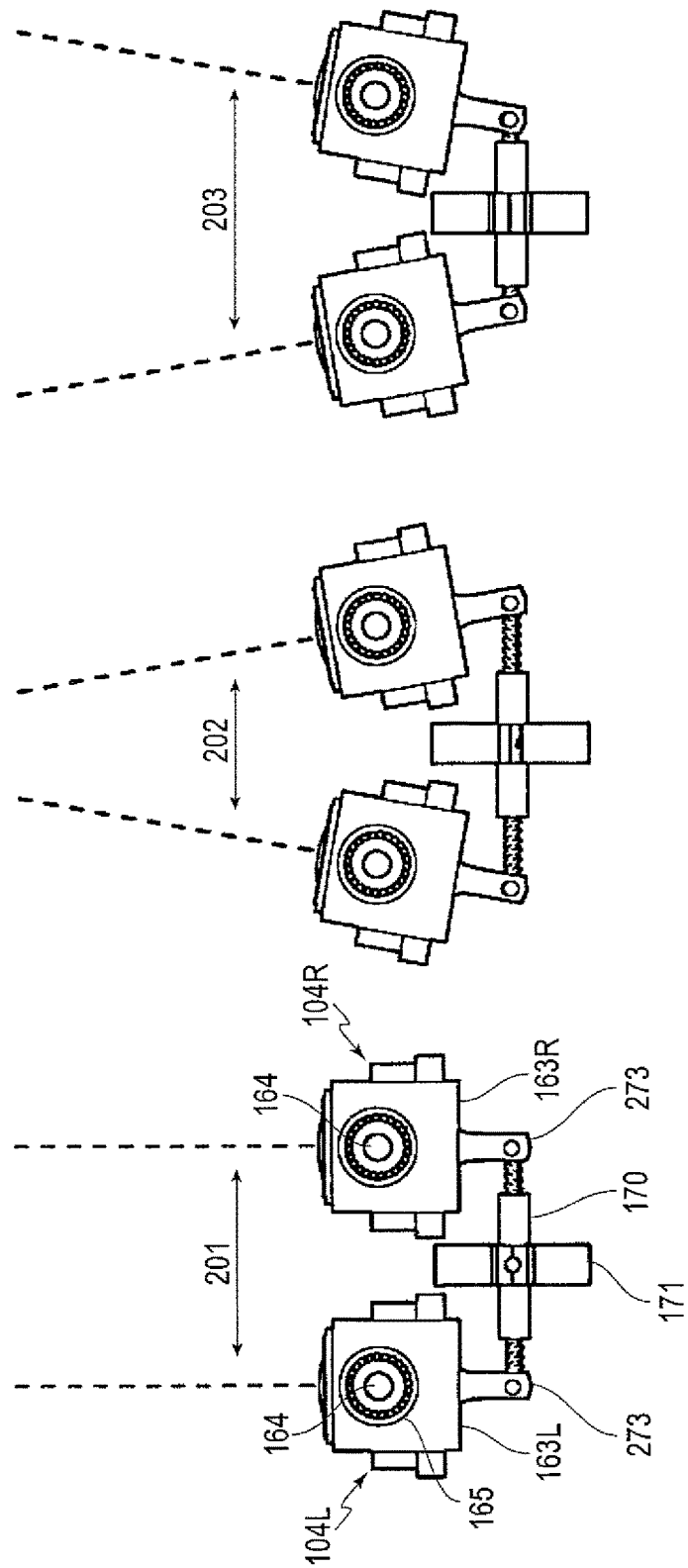
FIGS. 10A-10C are top views of the camera device showing an adjustment of the convergence angle using the turnbuckle adjustment mechanism.

The axial center of the central body 170C of the turnbuckle 170 can include a turnbuckle guide hole 270. Also, the axial center of the finger gear wheel 171 can include radial hole 280 (FIG. 9). During assembly, the turnbuckle guide hole 270 can be aligned with the radial hole 280 in the finger gear wheel 171. The finger gear wheel 171 can be coupled to the turnbuckle guide hole 270 in the central body 170C of the turnbuckle 170 via a finger gear wheel pin 280. Specifically, the finger gear wheel pin 280 can be simultaneously press fitted to the turnbuckle guide hole 270 in the central body 170C of the turnbuckle 170 and the radial hole 280 in the finger gear wheel 171. Upon completion of the assembly, the finger gear wheel 171 can be accordingly positioned at the axial center of the central body 170C of the turnbuckle 170. Accordingly, the threaded portions 170L, 170R of the turnbuckle 170 can simultaneously rotate with the rotation of the finger gear wheel 171.

FIG. 9 illustrates a top view of an assembled turnbuckle 170 in the camera device 102. The threaded portions 170L, 170R of the turnbuckle 170 are threaded in opposite directions. Upon rotation of the finger wheel 171, each threaded portion 170L, 170R is simultaneously screwed inwardly or screwed outwardly. Thus, in operation, the user 100 can rotate the finger gear wheel 171 that protrudes from the top of the camera support housing 168 of the camera device 102. As the finger gear wheel 171 rotates, the threaded portions 170L, 170R of the turnbuckle extend outwardly or retract inwardly from the central body 170C of the turnbuckle 170. Accordingly, the angular position of the video camera sensor modules 104L, 104R rotates about pins 164. The turnbuckle 170 can provide a precise push and pull motion to adjust the convergence and divergence of the camera lenses 162L, 162R in the camera device 102. Thus, the user 100 can advantageously calibrate the three-dimensional effect of the image produced by the camera device 102. The pin 164 can be positioned such that a center of rotation for the video camera sensor modules 104L, 104R is at a rear of the optics and at a front edge of the imaging sensor. This configuration provides the closest accuracy for achieving stereoscopic alignment. Different degrees of stereoscopic depth combinations can be provided by varying the length of the turnbuckle 170, the length of the turnbuckle connection arm 169, and/or the spacing between the camera modules 104L, 104R.

The dimensions of the turnbuckle 170 and the threaded portions 170L, 170R can also affect the calibration of the video camera sensor modules 104L, 104R. The length of the turnbuckle 170 can range from 5 mm to 100 mm or from 12 mm to 75 mm, for example. The coarser the thread of the turnbuckle 170 (the larger the pitch of the thread), the lower the calibration resolution at the finger gear wheel 171. On the other hand, the finer the thread of the turnbuckle 170 (the smaller the pitch of the thread), the higher the calibration resolution at the finger gear wheel 171. Accordingly, the pitch of the turnbuckle 170 should preferably be in the range of 25 to 60 threads per inch or 35 to 50 threads per inch. These ranges can provide for relatively quick adjustments using the finger wheel 171, while maintaining extremely high precision positional accuracy.

FIGS. 10A-C illustrate top views of three exemplary positions of the video camera sensor modules 104L, 104R in the camera device 102. The three positions can be set when the video camera sensor modules 104L, 104R are in the parallel orientation 201, converged orientation 202 and diverged orientation 203. The ideal convergence/divergence positions can depend on the range the video display glasses 101, e.g., based on the quality and quantity of the LEDs used in the infrared illumination system 103 and the camera device 102, as discussed above, and the distance of the object on which the user wishes to focus.

For example, a converged orientation 202 can provide a close-object viewing configuration for the video display glasses 101 where a three-dimensional image can be displayed. In this configuration, the finger gear wheel 171 can be rotated counterclockwise so that the external threaded portions 170L, 170R in the turnbuckle 170 extend beyond the centerline of the video camera sensor modules 104L, 104R, causing them to rotate inwardly about their respective bearing pins 164. The converged orientation 202 can allow the user 100 to more clearly see an image closer than the image provided by the parallel orientation 201 depending on the available range.

The diverged orientation 203 can be a position where the video camera sensor modules 104L, 104R are angled away from each other creating a wide camera viewing angle. The diverged orientation 203 can provide a far-object viewing configuration for the video display glasses 101 where a three-dimensional image can be displayed. In this configuration, the finger gear wheel 171 can be rotated clockwise where the ends of external threaded portions 170L, 170R of the turnbuckle 170 retract inward of the centerline of the sensor modules 104L, 104R, causing each of the video camera sensor modules 104L, 104R to rotate outwardly about their respective bearing pins 164. The diverged orientation 203 can allow the user 100 to more clearly see an image farther than the image provided by the parallel orientation 201 operational mode depending on the available range.

Figure 11:
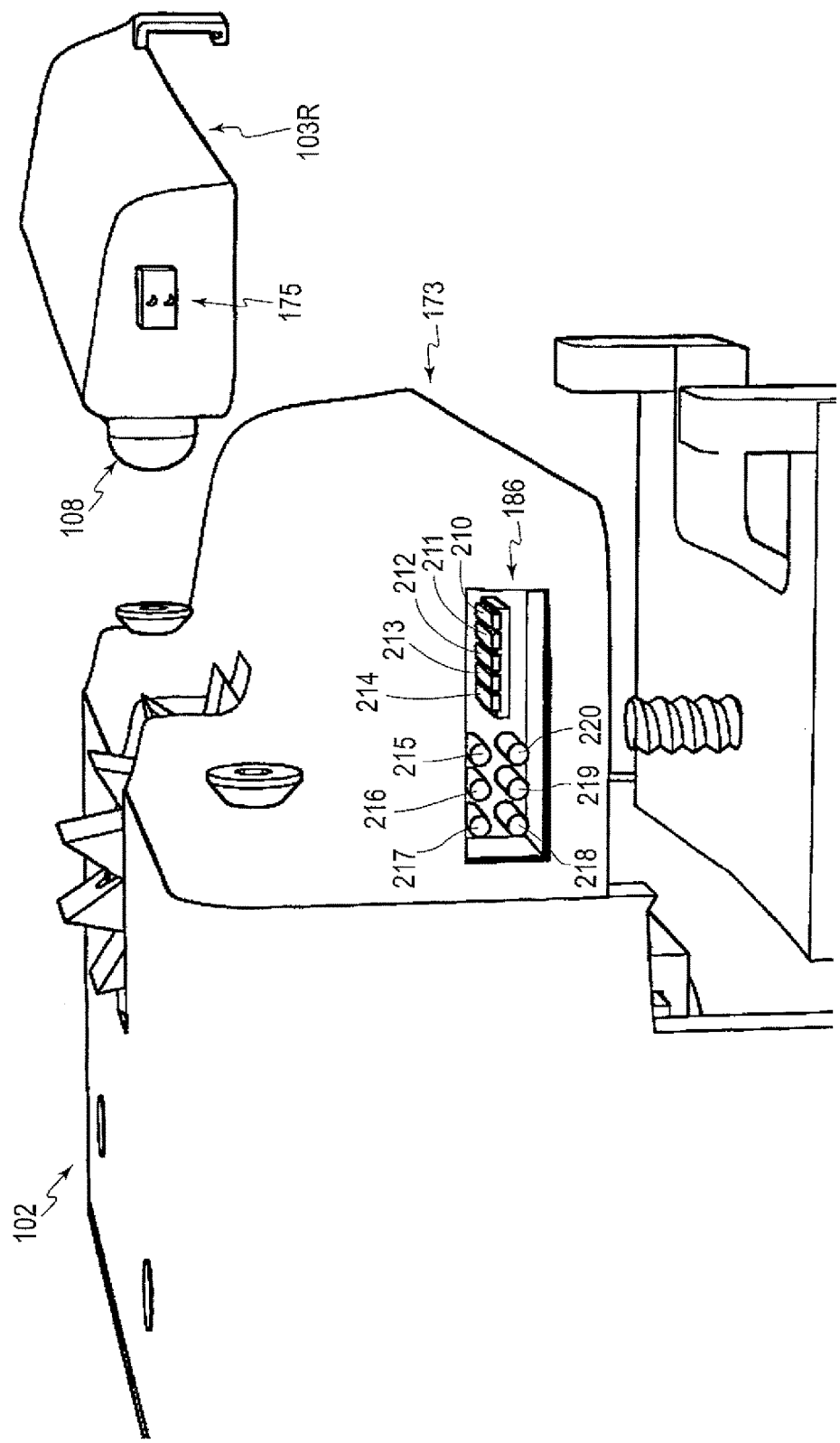
FIG. 11 is a close-up view of the data port in the rear camera housing.

FIG. 11 illustrates a close up view of the data port 186 on the side of the rear camera housing 173. As discussed above, the data port 186 can transmit audio data, video data and power to and from the camera device 102. Specifically, the data port 186 can include video signal outputs 210, 211. The video signal outputs 210, 211 can transfer video signal data to and from each of the video camera sensor modules 104L, 104R, respectively. The data port 186 can include a ground 212 that acts as a reference point for voltage measurement and can minimize the accumulation of static energy in the camera device 102. The data port 186 can further include an audio ground 213 and an audio signal output 214. The audio ground 213 can act as a reference point for audio data measurement. The audio signal output 214 can transfer audio data to and from the microphone 106 of the camera device 102.

Furthermore, the data port 186 can include various power ports. Specifically, the data port 186 can include a camera power port 215, an auxiliary power port 216, an LED illumination system power port 217, and a second auxiliary power port 219. These power ports can supply power to the camera device 102, the infrared illumination system 103 and to various other components in the video display glasses 101. Finally, the data port 186 can include an LED power ground 218 and a video power ground 220 that can act as a reference point for voltage measurement and can minimize the accumulation of static energy in the camera device 102.

Figure 12:
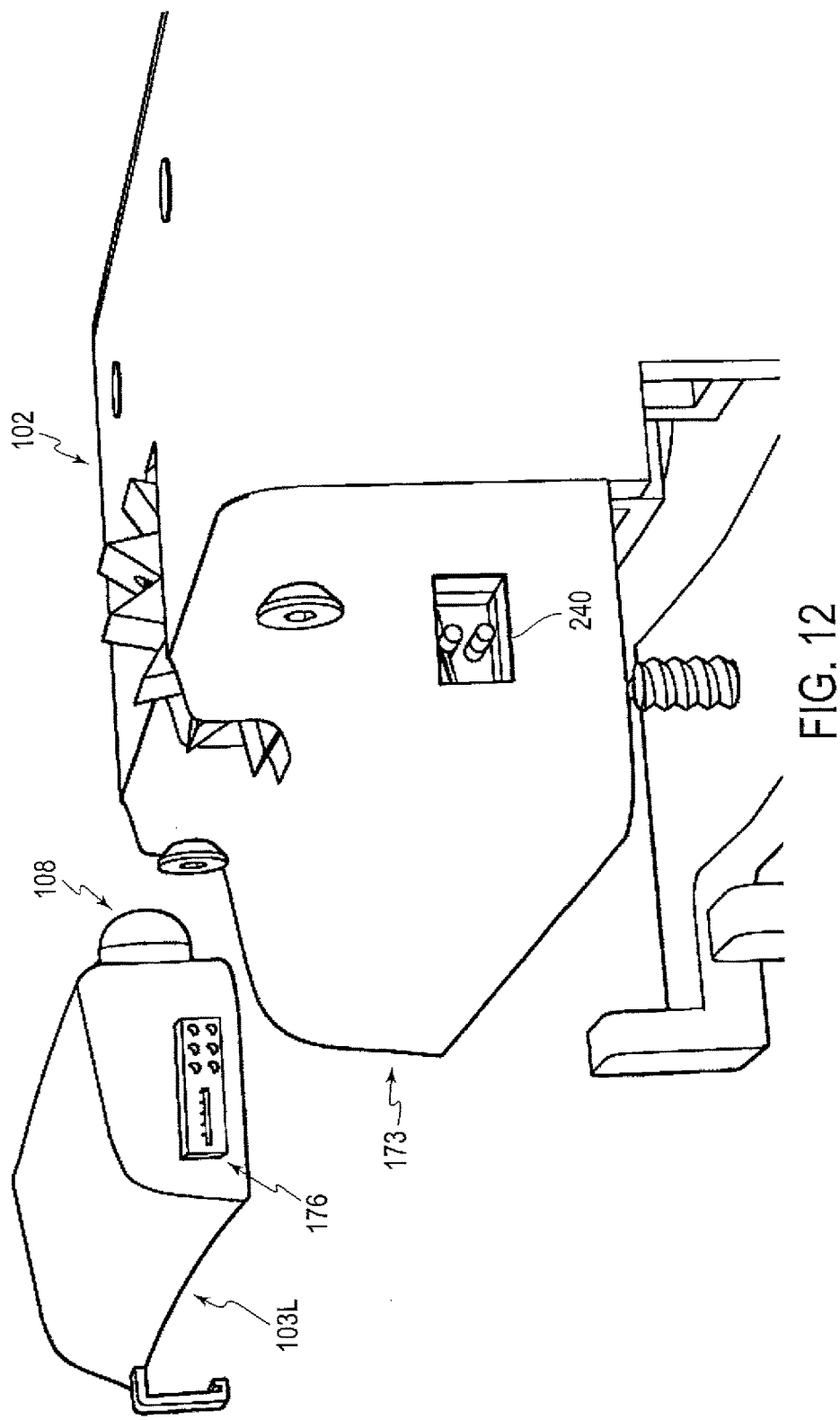
FIG. 12 is a close-up view of the rear camera housing on the opposite side illustrated in FIG. 11.

FIG. 12 illustrates a close up view of the rear camera housing 173 on the opposite side illustrated in FIG. 11. Specifically, the light bar power connector 175 of the right light bar 103R can connect to a right infrared LED power port 240 in the rear camera housing 173 of the camera device 102. The power port 240 can provide operating power to the right light bar 103R. The data port 186 illustrated in FIG. 11 can connect to the left light bar 103L via the data port pass-through connector 176.

Figure 13:
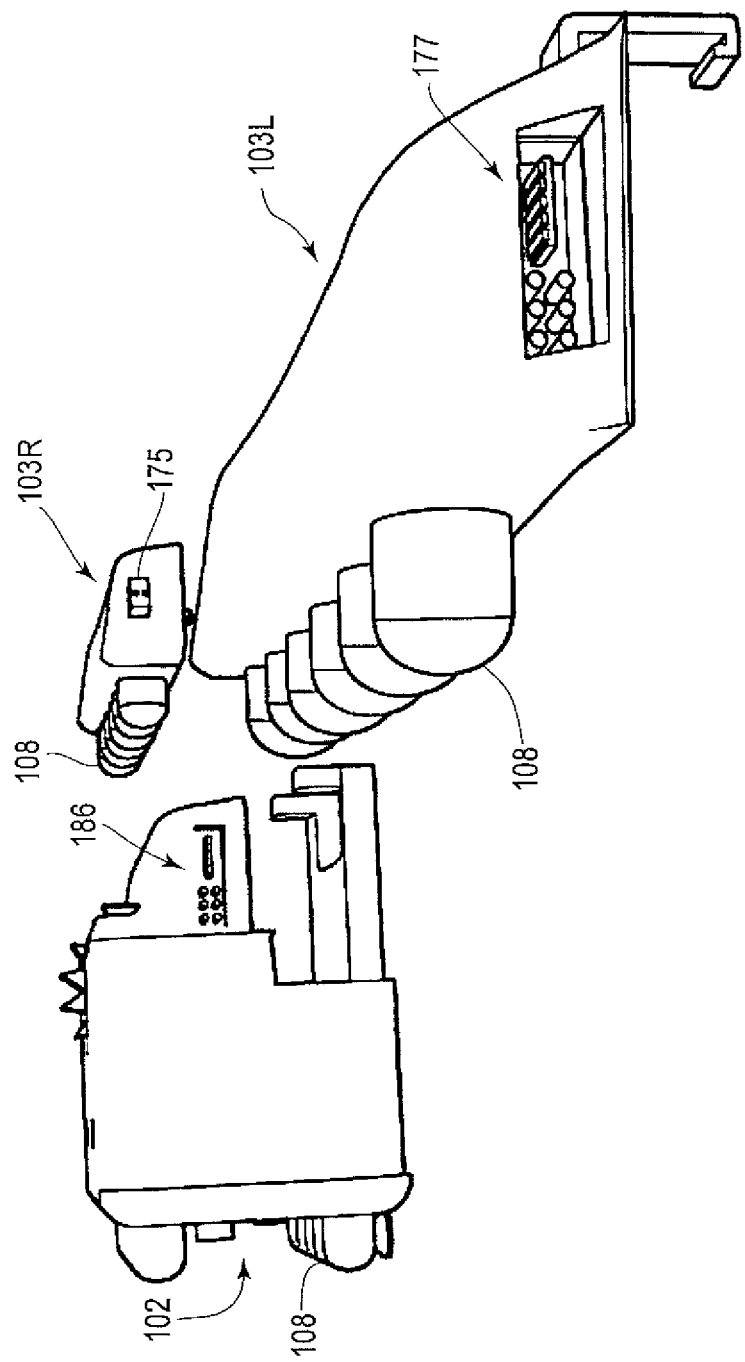
FIG. 13 is a side-view of the camera device and the infrared illumination components in a disassembled state.

FIG. 13 illustrates the camera device 102 and the light bars 103L, 103R in a disassembled state. The camera device 102 can connect to the left light bar 103L via the interface between the data port 186 and data port pass-through connector 176. Additionally, the camera device 102 can connect to the right light bar 103R via the interface between the light bar power connector 175 and the power port 240. The transmission of power and data between the camera device 102 and the infrared illumination system 103 can take place through internal wiring connected to these ports/connectors. In this preferred embodiment, a data port 177 in the left light bar 103L can connect to an external cable. The data port 177 can provide to the video display glasses 101 operational power, as well as transfer audio data and video data to and from the external cable.

As discussed above, the light bar power connector 175 and the power port 240 can transfer operational power but may not transfer any audio data or video data. Rather, the data port 186 and data port pass-through connector 176 can transfer the audio data and the video data in addition to operational power. The primary reason why this condition can be present is because the data port 177, where the external cable connects to, can be located at the left light bar 103L. As an alternate embodiment, the data port 177 can be located at the right light bar 103R. In another alternate embodiment, data ports 177 can be located at both ends of each of the light bars 103R, 103L. Accordingly, the above described ports can be configured to transfer power, audio data and video data in both directions.

Figure 14:
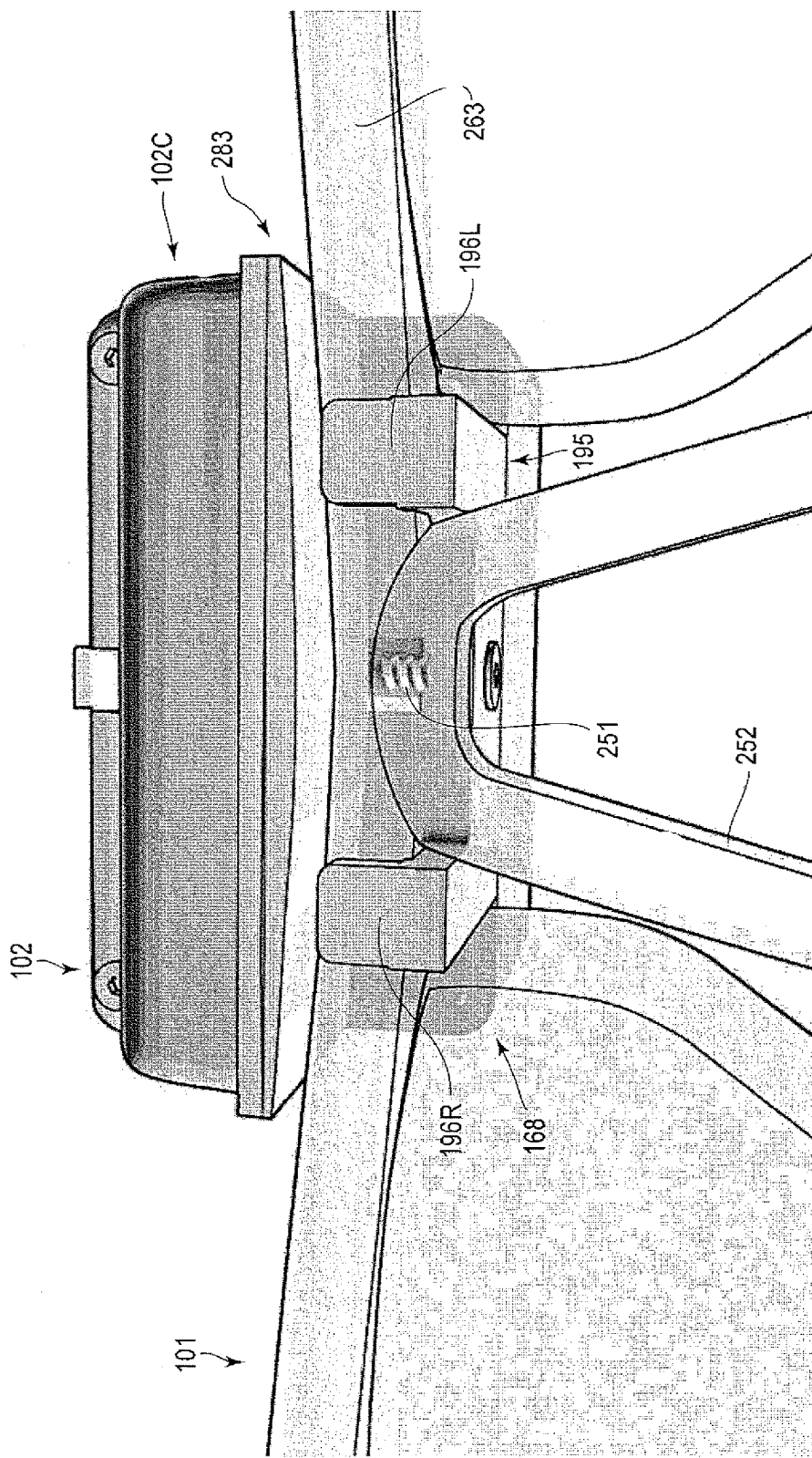
FIG. 14 is a close-up view illustrating a camera device clip-on structure that fastens the camera device to the video display glasses.

FIG. 14 illustrates the camera device clip-on structure 195 that can fasten the camera device 102 to the video display glasses 101. As illustrated in FIG. 7, the camera device clip-on structure 195 can be part of a bottom surface of the camera support housing 168 to mount the camera support housing 168 to an edge of a frame 263 of the video display glasses 101. Specifically, J-shaped prongs 196L, 196R of the camera device clip-on structure 195 can be positioned on each outer side of the nose bridge 252 between the eyeglass area of the video display glasses 101. The J-shaped prongs 196L, 196R can advantageously prevent the camera device 102 from easily falling of the video display glasses 101. When the user 100 is wearing the video display glasses 101, the nose bridge 252 can contact the nose of the user 100 to provide cushion and comfort.

A nose bridge set screw 251 can secure the camera device clip-on structure 195 to the video display glasses 101. The set screw 251 can be located substantially at the center of the camera device 102 and substantially at the center of the nose bridge 252. The set screw 251 can engage internal threads of the camera device 102 and the eyeglass frame 263 to provide a secure mount. The set screw 251 can be an appropriate length to ensure full engagement between the camera device 102 and the eyeglass frame 263 as discussed above. At the same time, the set screw 251 does not extend beyond the surface of the nose bridge 252 to avoid contact with the nose of the user 100 during use.

The camera device clip-on structure 195 can be made of a flexible material, such as Nylon 6, 11 and 12. The camera device clip-on structure 195 can include adhesive support pads 253. The adhesives support pads 253 can be located on the bottom surface of the rear camera housing 173 and positioned on top of the frame 263 of the video display glasses 101 when the camera device 102 is attached to the glasses 101. Accordingly, when the camera device 102 is mounted, the frame 263 of the video display glasses 101 can be positioned between the rear camera housing 173 and the camera device clip-on structure 195 of the camera support housing 168 within the notch 172 (see FIG. 7). Preferably, the adhesive support pads 253 can be a two layer adhesive system. Alternatively, a VELCRO© stick on material or an attractive magnetic material can be used. The adhesive support pads 253 can advantageously provide additional stability and mounting support to the curvature of the frame 263 of the video display glasses 101. The adhesive support pads 253 can be desired because of the size and weight of the camera device 102 when mounted on the video display glasses 101.

Figure 15:
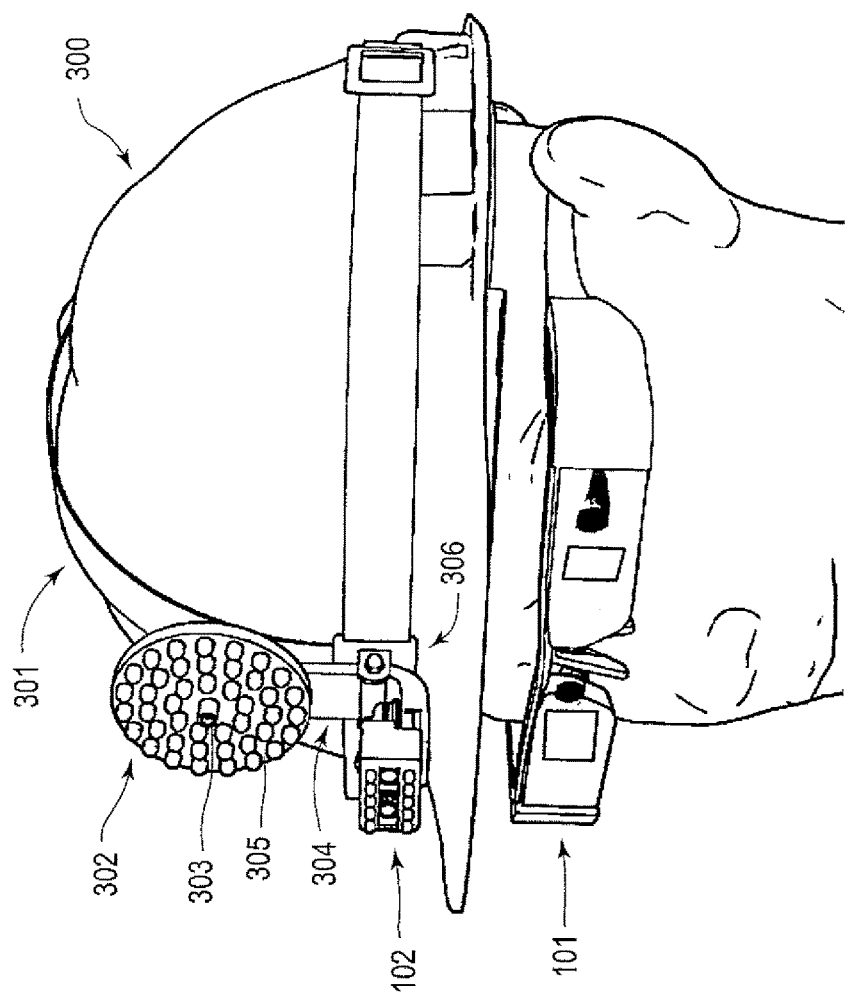
FIG. 15 is a perspective view showing a user wearing video display glasses with a high output infrared illumination system mounted on a hard hat.

FIG. 15 illustrates an alternate embodiment of the user 100 wearing the video display glasses 101 with the camera device 102 and a high output infrared illumination system 302 mounted on a hard hat 300. Although this embodiment illustrates a hard hat 300, the camera device 102 and the high output infrared illumination system 302 can be mounted on various types of surfaces including a baseball cap, a helmet, a winter hat or even a bald head, for example.

The camera device 102 can be mounted on a first end of a support device 304. A second end of the support device 304 can support a high output infrared illumination system 302. The support device 304 can be attached to a pivot bracket attachment 306. The pivot bracket attachment 306 can be mounted on a strap-on attachment system 301. The strap-on attachment system 301 can extend around the hard hat 300 at a vertical position that intersects with a plane parallel to a the forehead of the user 100. Additionally, the strap-on attachment system 301 can extend over the top of the hard hat 300 to be secured on a surface substantially extending from a center of the forehead of the user 100 to a top-center portion of the user's head and to the back of the head of the user 100. The strap-on attachment system 301 can be adjusted by a buckle assembly to appropriately fit on the hard hat 300. In this manner, the strap-on attachment system 301 can be reliably secured to the hard hat 300.

Figure 16:
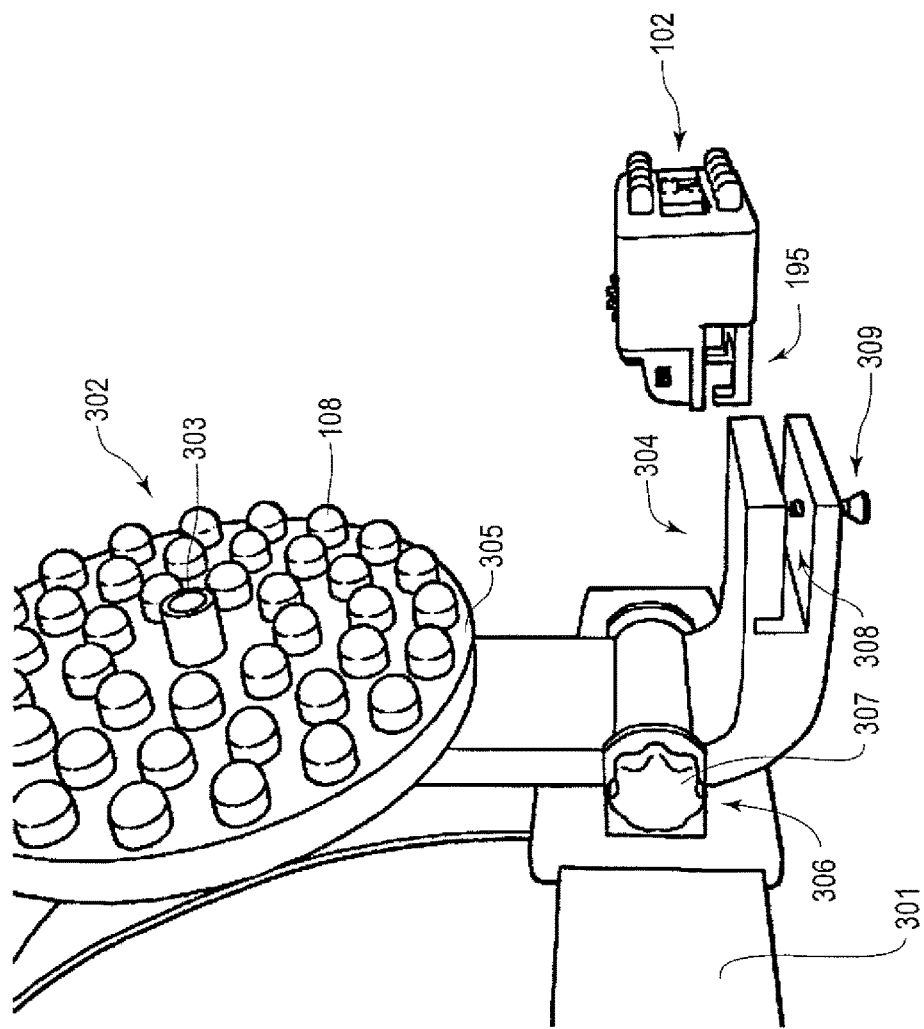
FIG. 16 is a perspective view illustrating the support device for the high output infrared illumination system shown in FIG. 15.

FIG. 16 further illustrates the support device 304 illustrated in FIG. 15. The support device 304 can be an L-shaped member that can be substantially 90°. The L-shaped support device 304 can be advantageously shaped in this manner so that the camera device 102 and the high output infrared illumination system 302 are always directed parallel to each other at the same environment.

The support device 304 can include a clip-on attachment structure 308 at a first end to engage the camera device 102. The clip-on attachment structure 308 has a two-prong, fork-like shape where the camera device clip-on structure 195 can engage. Specifically, the camera device clip-on structure 195 at the base of the camera device 102 can mate with the clip-on attachment structure 308 of the support device 304 which acts as a keyway slot. Accordingly, the rear camera housing 173 can be positioned on top of the support device 304 and the camera support housing 168 can be substantially positioned at a front surface of the support device 304. This connection can be secured by an attachment screw 309 that engages a portion of the clip-on attachment structure 308 and the camera device clip-on structure 195.

The second end or the top portion of the support device 304 can also be fastened to and support the high output infrared illumination system 302. A back surface of the high output infrared illumination system 302 can be where the support device 304 can be fastened to. Preferably, the high output infrared illumination system 302 can include a plurality of infrared LED illuminators 108 arrayed in a circular shape. Alternatively, the high output infrared illumination system 302 can configure the plurality of infrared LED illuminators 108 to be arrayed in a triangular shape or a rectangular shape. A variety of configurations that position the plurality of infrared LED illuminators 108 are contemplated to achieve an appropriate viewing range for the camera device 102. In another alternate embodiment, the high output infrared illumination system 302 can include at least one of infrared, white light and ultraviolet illuminators. Such a configuration can allow for the high output infrared illumination system 302 to be operational in a variety of different lighting conditions.

The high output infrared illumination system 302 can include a light sensor 303 that can automatically detect lowlight conditions and activate the high output infrared illumination system 302 to operate. The light sensor 303 can cooperate with the high output infrared illumination system 302 in a similar manner that the light sensor 107 can cooperate with the infrared illumination LEDs 108 as discussed above. The high output infrared illumination system 302 can also include a rear power connector 305. The power connector 305 can be located on a face of the high output infrared illumination system 302 opposite to the face including the plurality of infrared LED illuminators 108. The power connector 305 can be connected to a power source and supply power for the high output infrared illumination system 302 to operate.

The support device 304 can be adjusted to rotate and tilt the high output infrared illumination system 302 and the camera device 102. However, the shape of the support device 304 can ensure that the high output infrared illumination system 302 and the camera device 102 are directed in the same orientation parallel to each other. The pivot bracket attachment 306 can clamp the support device 304 into position. The support device 304 can be adjusted by the pivot bracket attachment 306 which can be mounted on the strap-on attachment system 301 of the hard hat 300. The pivot bracket attachment 306 can include a tension knob 307 that can allow the user 100 to adjust the clamping force that restrains the support device 304. When the user 100 wishes to adjust the support device 304, the user 100 can turn the tension knob 307 counterclockwise to reduce the clamping force of the pivot bracket attachment 306 and rotate the support device 304 to a desired tilt position. After the support device 304 is in the desired tilt position, the user 100 can turn the tension knob 307 clockwise to increase the clamping force of the pivot bracket attachment 306 and clamp the support device 304 securely in place.

The user 100 can wear the video display glasses 101 with the camera device 102 mounted on the hard hat 300 at various positions. The camera device 102 and the high output infrared illumination system 302 can be positioned in a directly forward orientation, a tilted up orientation and a tilted down orientation. These three orientations and various intermediate orientations can be positioned by the rotation of the support device 304 as discussed above. Preferably, the camera device 102 and the high output infrared illumination system 302 can rotate together. Alternatively, the support device 304 can be a two piece assembly that can respectively secure the camera device 102 and the high output infrared illumination system 302. Under this configuration, the camera device 102 and the high output infrared illumination system 302 can be configured to adjust and rotate independently from each other. All three of these orientations can take place with the user 100 wearing the video display glasses 101 and looking directly forward.

In the directly forward orientation, the camera device 102 and the high output infrared illumination system 302 can be in a normal position that can be substantially parallel to the direction of view of the user 100. Thus, the viewport prisms 101L, 101R of the video display glasses 101 can project an image that substantially corresponds to the image that is directly in front of the user 100.

In the tilted up orientation, the camera device 102 and the high output infrared illumination system 302 can be in a tilted position that is rotated upwardly at a desired angle above the direction of view of the user 100. Thus, the viewport prisms 101L, 101R of the video display glasses 101 can project an image that is above the view directly in front of the user 100. As a result, the user 100 can advantageously see at a higher viewing angle through the viewport prisms 101L, 101R without the user 100 tilting his head up.

In the tilted down orientation, the camera device 102 and the high output infrared illumination system 302 can be in a tilted position that is rotated at a desired angle below the direction of view of the user 100. Thus, the viewport prisms 101L, 101R of the video display glasses 101 can project an image that is below the view directly in front of the user 100. As a result, the user 100 can advantageously see at a lower viewing angle through the viewport prisms 101L, 101R without the user 100 tilting his head down.

Figure 17:
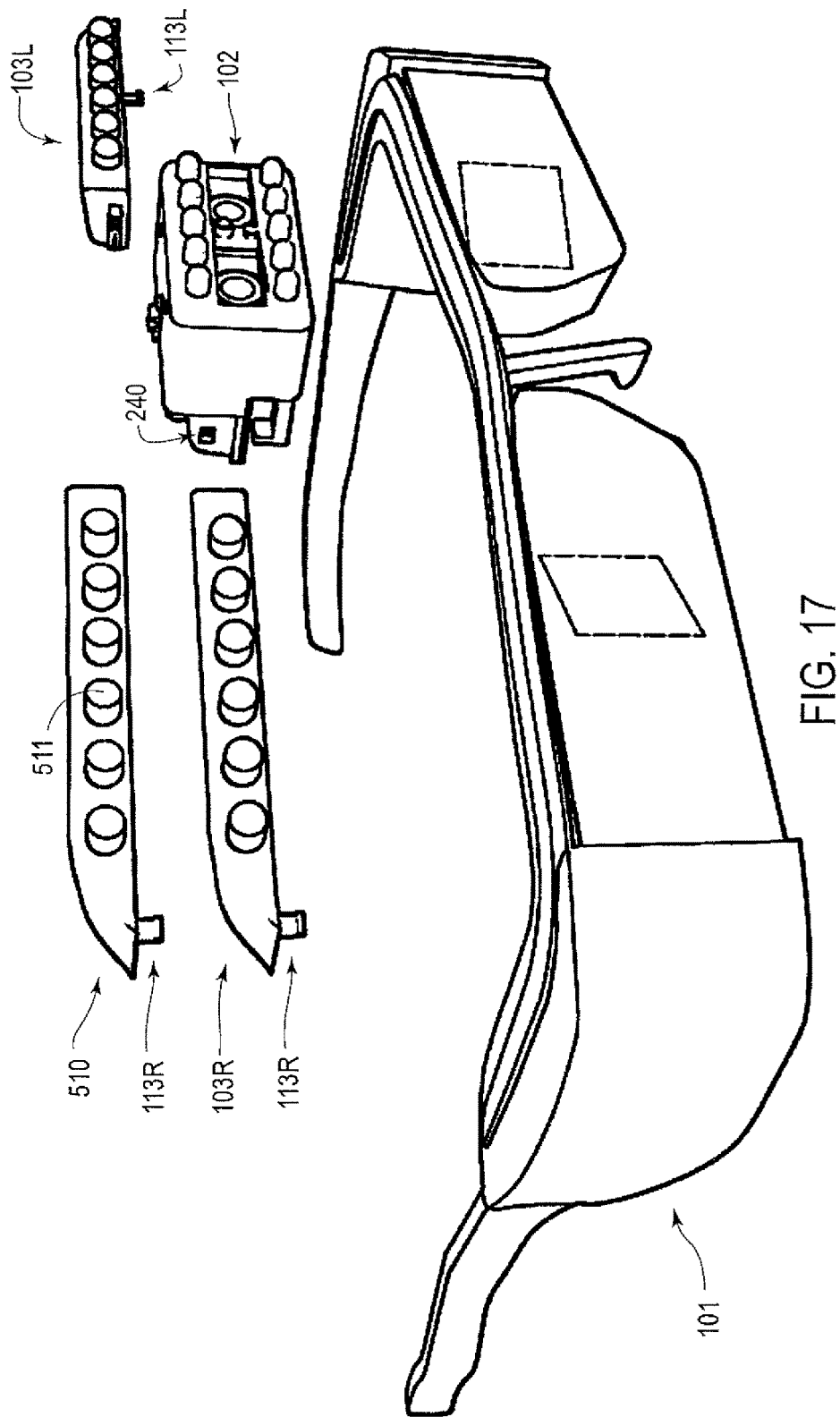
FIG. 17 is an exploded perspective view of the camera device with the infrared illumination system and an ultraviolet LED light bar.

FIG. 17 illustrates the camera device 102 with the infrared illumination system 103 and an ultraviolet LED light bar 510 to enhance vision capabilities. The ultraviolet LED light bar 510 can include a plurality of six ultraviolet light LEDs 511, for example, that can expand the source of vision to include ultraviolet light. The ultraviolet LED light bar 510 can replace the right side infrared illumination light bar 103R and can be attached via the clip-on frame support 113L, 113R to the frame of the video display glasses 101 as similarly discussed above. The ultraviolet LED light bar 510 can include the light bar power connector 175 that can engage the power port 240 of the camera device 102. Similarly, the ultraviolet LED light bar 510 can replace the left side infrared illumination light bar 103L and can engage the camera device 102 in a similar manner discussed above.

In an alternate embodiment, the ultraviolet LED light bar 510 can attach on the top surface of the right side infrared illumination light bar 103R to further enhance the vision capabilities of the video display glasses 101. The ultraviolet LED light bar 510 can attach to the right side infrared illumination light bar 103R via the clip-on frame support 113L, 113R in a similar manner as discussed above. Additionally, the ultraviolet LED light bar 510 can include a power connector that connects to the right side infrared illumination light bar 103R to receive power. A similar configuration can be employed with the ultraviolet LED light bar 510 and the left side infrared illumination light bar 103L.

As discussed above, the camera device 102 can have a very wide spectral range that goes well beyond what the human eye can see. The camera device 102 can detect imagery across the entire white light spectrum and into the ultraviolet and infrared light spectrum. Materials that are sensitive to ultraviolet light can be imaged by the camera device 102 in a spectral range that goes beyond the normal vision of the human eye. Combining ultraviolet light capabilities with the infrared light capabilities of the camera device 102 can advantageously result in additional visual information for the user 100 to see.

Figure 18:
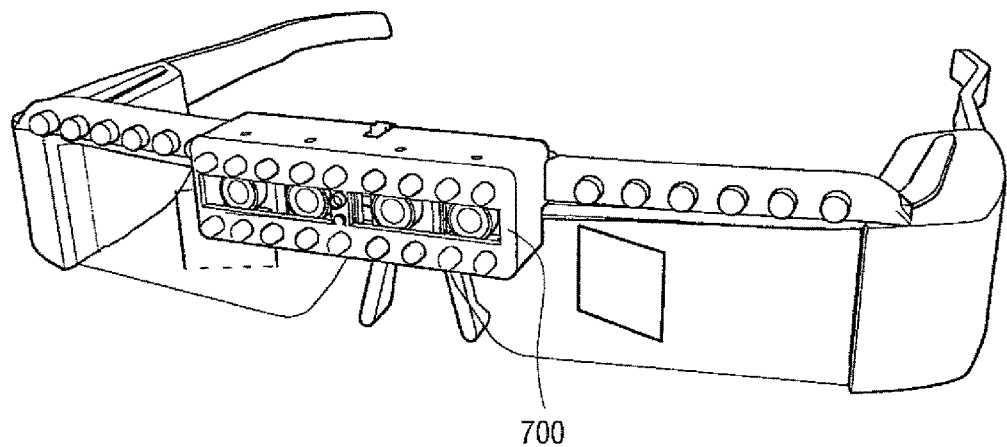
FIG. 18 is a perspective view of an infrared video display glasses according to another embodiment.

FIG. 18 illustrates an alternate embodiment of infrared video display glasses 700 including two additional LWIR cameras. The two additional LWIR cameras can advantageously provide the user with simultaneous digital video viewing across white light, ultraviolet light, active infrared light and thermal infrared light spectrum. Unless otherwise specified, the structural composition of the infrared video display glasses 700 is similarly constructed and functions in a similar manner as the camera device 102. The infrared video display glasses 700 also cooperates with the video display glasses 101 and the hard hat 300 in a similar manner as discussed above.

Figure 19:
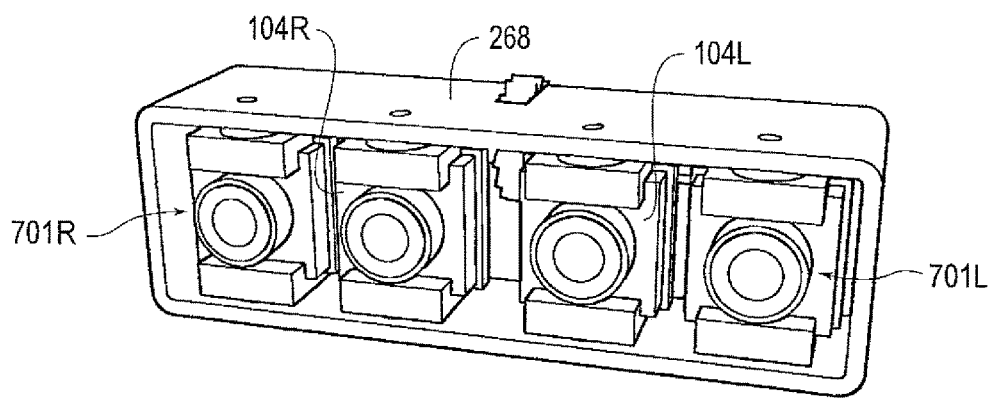
FIG. 19 is a front view of two LWIR cameras and two video camera sensor modules in a camera support housing.

FIG. 19 illustrates the two LWIR cameras 701L, 701R in the camera support housing 268. The camera support housing 268 can be an extension of the camera support housing 168 discussed above and can accommodate the two LWIR cameras 701L, 701R on opposite ends outside of the video camera sensor modules 104L, 104R. The LWIR cameras 701L, 701R can image thermal infrared emissions in a wavelength band of approximately 8 to 14 microns. The LWIR cameras 701L, 701R can produce real-time color video imaging or black and white video imaging of a scene and/or an object with temperature varying in a range from 32° F. to 212° F. (0° C. to 100° C.).

Figure 20:
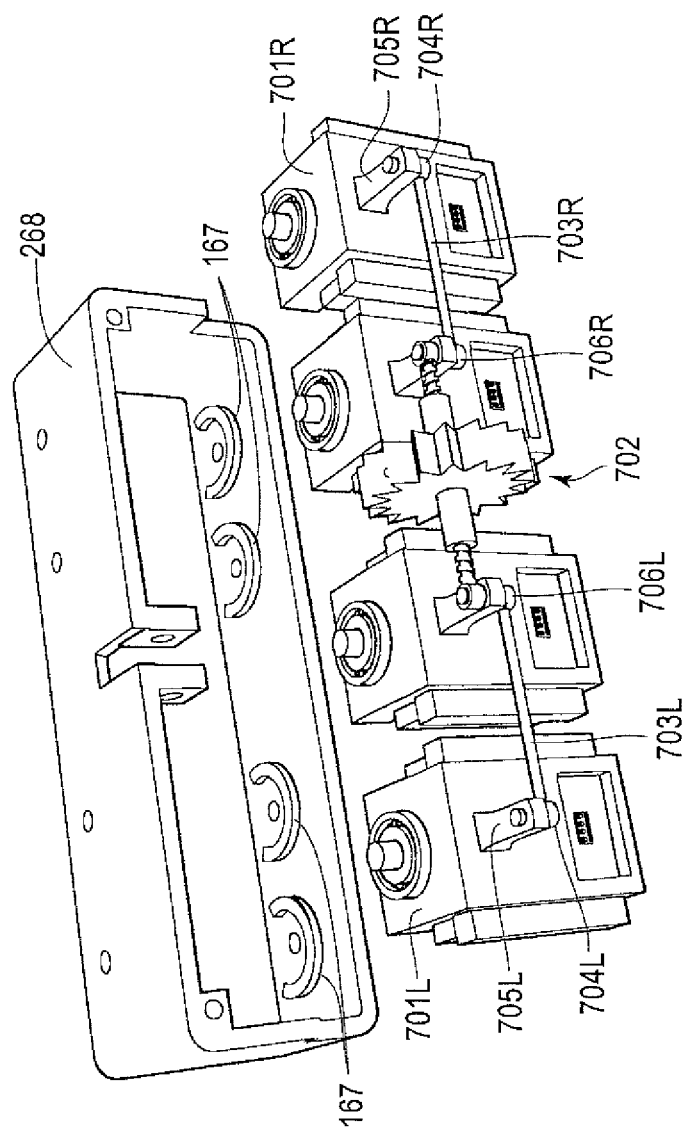
FIG. 20 is an exploded perspective view of the camera support housing and the camera device showing a turnbuckle adjustment mechanism.

FIG. 20 illustrates an exploded view of the camera support housing 268 and a turnbuckle adjustment mechanism 702 of the infrared video display glasses 700. The camera support housing 268 can include additional bearing support guides 167 for the LWIR cameras 701L, 701R to engage and rotate in a similar arrangement as discussed above.

The turnbuckle adjustment mechanism 702 is described below. The turnbuckle adjustment mechanism 702 can interface and cooperate with the assembled turnbuckle 170 as discussed above. Specifically, on a rear surface of the LWIR cameras 701L, 701R can include turnbuckle connection arms 705R, 705L. Turnbuckle pins 704R, 704L can fasten each of the turnbuckle connection arms 705R, 705L to respective connecting rods 703R, 703L at one end. At an other end of the connecting rods 703R, 703L, turnbuckle pins 706R, 706L can fasten the turnbuckle connection arms 169 of each of the video camera sensor modules 104L, 104R to the connecting rods 703R, 703L. In this manner, the turnbuckle adjustment mechanism 702 is synchronized to the assembled turnbuckle 170 such that all four cameras 701L, 701R, 104L, 104R move together.

Such a configuration can advantageously allow the user to adjust the angular position of all four cameras 701L, 701R, 104L, 104R simultaneously. The connecting rods 703R, 703L can be maintained at a specific length to provide a precise push and pull motion to adjust the convergence and divergence of each of the camera lenses in the infrared video display glasses 700. Thus, the user 100 can advantageously calibrate the three-dimensional effect of the image produced by the infrared video display glasses 700.

The cooperation of the video camera sensor modules 104L, 104R and the LWIR cameras 701L, 701R can provide the following advantages. The user wearing the infrared video display glasses 700 can optionally view three dimensional images in only infrared mode or in only LWIR mode. Alternatively, the real-time video from the two sets of cameras 104L, 104R, 701L, 701R can be superimposed over each other with varying levels of intensity. Thus, the infrared video display glasses 700 can operate in three separate modes: (1) infrared mode, (2) LWIR mode, and (3) infrared and LWIR mode. The following exemplary depiction shows how the varying levels of intensity in the third mode can be advantageously used.

A user wearing the infrared video display glasses 700 is at a scene of a multi-car pileup in the middle of a desert on a dark night. The infrared video display glasses 700 is in night vision viewing mode to survey the scene and look for survivors. The LWIR video intensity is increased to approximately 50% and mixes with the IR video. As a result, the user can see and avoid obstacles but can also see heat images increasing in and around a hood of a car indicating a possible fire. Additionally, the user can see body heat images of people lying in the wreckage. Since the user retains a natural vision through the transparent lenses of the infrared video display glasses 700, the user can act quickly based on the high depth perception of the environment that is simultaneously illuminated with active infrared light and the thermal infrared light.

Figure 21:
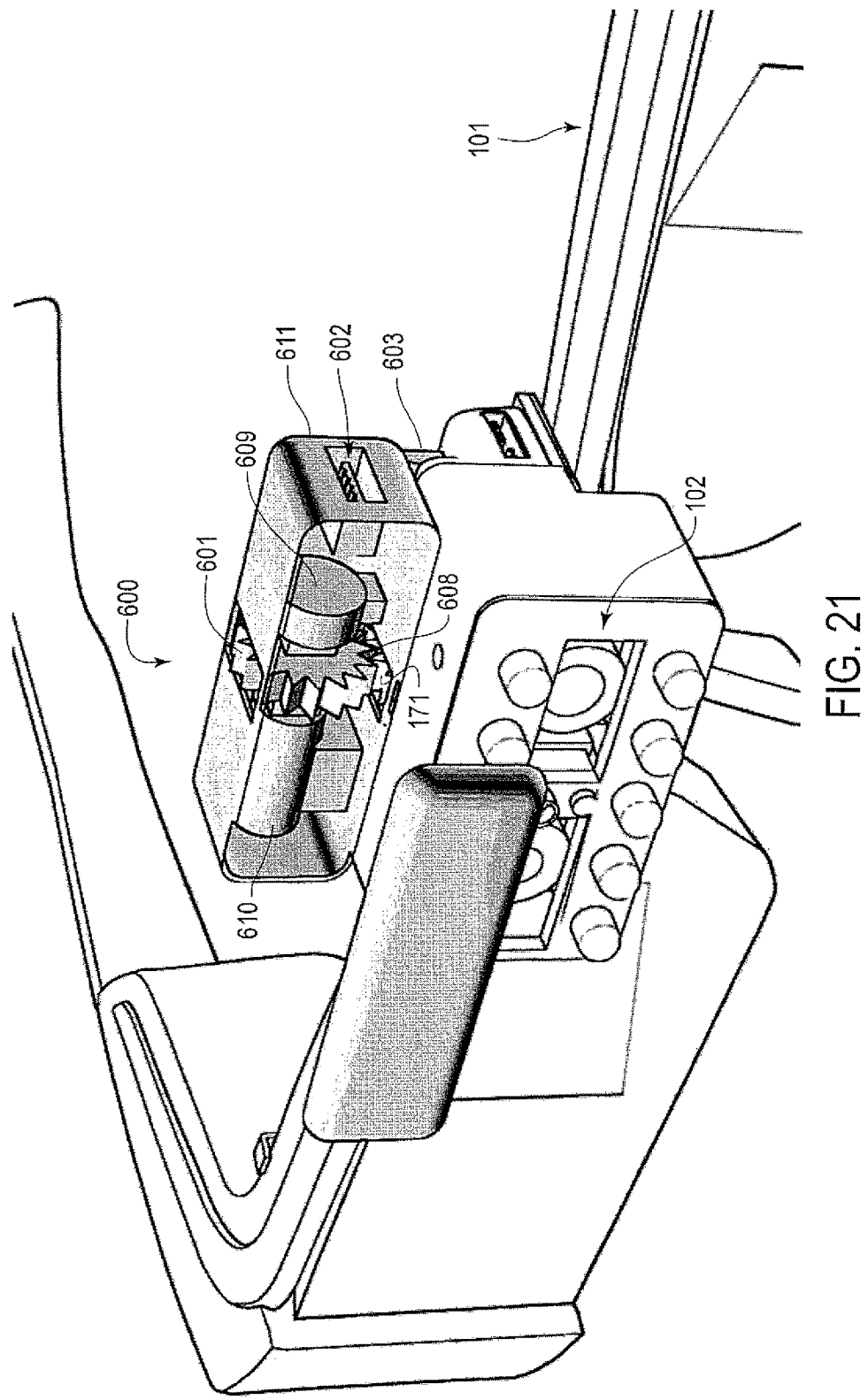
FIG. 21 is a perspective view of the camera device with an electro-mechanical smart motion control system.

FIG. 21 illustrates the camera device 102 with an electromechanical smart motion control system 600 for the video display glasses 101. The motion control system 600 can automatically control the convergence and the divergence of the video camera sensor modules 104L, 104R in the camera device 102. The motion control system 600 can be operated remotely or pre-programmed to operate automatically based on received viewing conditions and the vision of the user 100. Accordingly, the camera device 102 having the motion control system 600 can be used at a remote location away from the user 100 and mounted on, for example, a robot, a remote controlled vehicle or an aircraft. In this manner, the user 100 wearing the video display glasses 101 can see the stereoscopic real-time video image at the remote location.

The motion control system 600 can be positioned on top of the camera device 102. Specifically, the motion control system 600 can rest on the top surface of the camera support housing 168 and can be fastened by fasteners to the rear camera housing 173 via a motion control attachment structure 603. The motion control attachment structure 603 can include a mounting plate and mounting holes that can cooperate with the rear camera housing 173 to establish a secure connection.

The motion control system 600 can include a housing 611 substantially retaining a gear drive 601 that can engage (gear drive connection 608) with the finger gear wheel 171 via a slot in a bottom surface of a housing 611 of the motion control system 600. The gear drive 601 can be a similar size to the finger gear wheel 171 and can extend through a slot at a top surface of the housing 611 of the motion control system 600. Accordingly, the motion control system 600 can also provide manual adjustment to the user 100 via the gear drive 601 protruding from the slot at the top surface of the housing 611. The gear drive 601 can also be significantly larger than the finger gear wheel 171 to provide additional resolution to the user during manual operation.

The motion control system 600 can further include a micro optical encoder and microcomputer arrangement 609 and a micro electric motor 610 disposed within the housing 611. The encoder and microcomputer arrangement 609 can continuously detect the optical position of the camera device 102 based on the rotation of the gear drive 601 and the initial calibrated position of the video camera sensor modules 104L, 104R in the camera device 102. Optical position and calibration information can be exchanged to and from the encoder and microcomputer arrangement 609 remotely.

The electric motor 610 can cause the gear drive 601 to rotate. Preferably, the encoder and microcomputer arrangement 609 can control the electric motor 610 to rotate the gear drive 601 and adjust the optical position of the video camera sensor modules 104L, 104R in the camera device 102 based on pre-programmed algorithms. Alternatively, the encoder and microcomputer arrangement 609 can receive wireless input to control the electric motor 610. This configuration can advantageously provide remote three-dimensional stereoscopic viewing control of distant and close subjects by the divergence and convergence of the video camera sensor modules 104L, 104R. The positional information of the encoder and microcomputer arrangement 609 and the calibration information of the video camera sensor modules 104L, 104R can advantageously be used to determine a focal point between the video camera sensor modules 104L, 104R and a calculated viewing range or distance for the video display glasses 101. This feature can advantageously provide precise calculations of the position of the video camera sensor modules 104L, 104R and accurately determine the distance to a viewing object.

A power and data port 602 can be located at a side wall of the housing 611 of the motion control system 600. The port 602 can provide power to the motion control system 600, as well as transmit data to and from the motion control system 600. The data can include, for example, programming logic to operate the electric motor 610 via the encoder and microcomputer arrangement 609, angular position of the gear drive 601 and the positional data and/or the initial calibrated position of the video camera sensor modules 104L, 104R. To exchange the data, the port 602 can be connected to an external cable or the data can be transmitted wirelessly.

The embodiments of the stereoscopic video display glasses as set forth above are intended to be illustrative and not limiting. Various changes may be made without departing from the spirit and scope of the invention.

While the invention has been described in conjunction with the specific exemplary embodiments thereof, it is evident that many alternatives, modifications, and variations will be apparent to those skilled in the art. Accordingly, exemplary embodiments of the invention as set forth herein are intended to be illustrative, not limiting. There are changes that may be made without departing from the spirit and scope of the invention.

What is claimed is:

1. A wearable display apparatus for viewing video images of objects illuminated with infrared light, the display apparatus comprising:
   a transparent display that is positioned in a user's field of vision when the display apparatus is worn;
   an infrared light source that illuminates infrared light to a surrounding environment to cause infrared light images to be reflected from the surrounding environment;
   a stereoscopic video camera device including at least two cameras that each capture the reflected infrared light images of the illuminated surrounding environment, the surrounding environment to which the infrared light is illuminated including at least an area in front of the stereoscopic video camera device; and
   a projection system that receives the infrared light images from the stereoscopic video camera device, and projects (i) a first infrared-illuminated video image onto a transparent left eye viewport portion of the transparent display, the first infrared-illuminated video image overlapping a user's left eye field of vision, and concurrently, (ii) a second infrared-illuminated video image onto a transparent right eye viewport portion of the transparent display, the second infrared-illuminated video image overlapping a user's right eye field of vision,
   wherein projection of the first infrared-illuminated video image and the second infrared-illuminated video image onto the transparent display creates a stereoscopic image viewable by the user.

2. The wearable display apparatus according to claim 1, wherein the infrared light source includes an infrared light array that includes a plurality of infrared lights.

3. The wearable display apparatus according to claim 2, wherein the array is detachably mountable on the wearable display apparatus.

4. The wearable display apparatus according to claim 2, wherein the plurality of infrared lights are arranged around the stereoscopic video camera device.

5. The wearable display apparatus according to claim 1, wherein
   the infrared light source includes a plurality of infrared light arrays that each include a plurality of infrared lights, and
   each of the arrays is detachably mountable to the wearable display apparatus.

6. The wearable display apparatus according to claim 5, wherein at least one of the plurality of light arrays includes a substantially linear array of infrared lights.

7. The wearable display apparatus according to claim 1, wherein the stereoscopic video camera device includes a housing on which the at least two cameras are mounted.

8. The wearable display apparatus according to claim 1, wherein the stereoscopic video camera device is detachably mountable to the wearable display apparatus.

9. The wearable display apparatus according to claim 1, wherein the stereoscopic video camera device is arranged to be substantially centered about a user's nose when the wearable display apparatus is worn.

10. The wearable display apparatus according to claim 1, wherein the projection system includes (i) a first projector mounted on a left side of the wearable display and configured to project the first infrared-illuminated video image onto the left eye viewport portion, and (ii) a second projector mounted on a right side of the wearable display and configured to project the second infrared-illuminated video image onto the right eye viewport portion.

11. The wearable display apparatus according to claim 1, wherein when the wearable display apparatus is worn, the left-eye viewport is positioned substantially opposed to the user's left eye, and the right-eye viewport is positioned substantially opposed to the user's right eye.

12. The wearable display apparatus according to claim 1, wherein the left-eye and right-eye viewport portions constitute less than half of an area of the transparent display.

13. The wearable display apparatus according to claim 1, wherein in a lighted surrounding environment, the transparent display is configured for the user to simultaneously see (i) the surrounding environment through the transparent display; and (ii) the first and second infrared-illuminated video images.

14. The wearable display apparatus according to claim 1, further comprising an ultraviolet light source.

15. The wearable display apparatus according to claim 1, wherein
the at least two cameras are configured to capture reflected ultraviolet light-illuminated video images of the surrounding environment, and
the projector system is configured to (1) receive the ultraviolet light-illuminated video images from the at least two cameras and (2) project the ultraviolet light-illuminated video images onto the left eye viewport portion and the right eye viewport portion of the transparent display.

16. The wearable display apparatus according to claim 1, wherein
the at least two cameras are configured capture reflected thermal video images of the surrounding environment, and
the projector system is configured to (1) receive the thermal video images from the at least two cameras and (2) project the thermal video images onto the left eye viewport portion and the right eye viewport portion of the transparent display.

17. The wearable display apparatus according to claim 1, wherein the stereoscopic video camera device further includes a microphone device that receives and records sound.

18. The wearable display apparatus according to claim 1, wherein
the stereoscopic video camera device further includes a data port that transmits at least one of video data and audio data.

19. The wearable display apparatus according to claim 18, wherein
the data port is disposed on a side surface of the stereoscopic video camera device.

20. The wearable display apparatus according to claim 19, wherein the stereoscopic video camera device is configured to capture high definition video images.

21. The wearable display apparatus according to claim 1, wherein a distance between a centerline of a camera lens of each of the at least two cameras is within a range of 10 mm and 70 mm.

22. The wearable display apparatus according to claim 1, wherein the stereoscopic video camera device including at least two cameras that each capture first and second thermal images of the surrounding environment.

23. The wearable display apparatus according to claim 22, wherein
the projection system also receives the thermal images from the stereoscopic video camera device, and projects (i) the first infrared-illuminated video image and a first thermal video image onto the left eye viewport portion of the transparent display that overlaps the user's left eye field of vision and (ii) the second infrared-illuminated video image and a second thermal video image onto the right eye viewport portion of the transparent display that overlaps the user's right eye field of vision.

24. The wearable display apparatus according to claim 23, wherein
the first infrared-illuminated video image and the first thermal video image are projected at an adjustable intensity, and
the second infrared-illuminated video image and the second thermal video image are projected at the adjustable intensity.

25. The wearable display apparatus according to claim 22, wherein
the projection system also receives the thermal images from the stereoscopic video camera device, and projects (i) a first thermal video image onto the left eye viewport portion of the transparent display that overlaps the user's left eye field of vision and (ii) a second thermal video image onto the right eye viewport portion of the transparent display that overlaps the user's right eye field of vision.

26. The wearable display apparatus according to claim 1, wherein the at least two cameras capture reflected images from white light, ultraviolet light, active infrared light and thermal infrared light of the surrounding environment.

27. Wearable display glasses for viewing stereoscopic infrared-illuminated video images, the glasses comprising:
a transparent display that is positioned in a user's field of vision when the display glasses are worn;
a left-side frame and a right-side frame that support the transparent display and are respectively positioned over the user's left and right ears when the glasses are worn;
an infrared light source that illuminates infrared light to a surrounding environment to cause infrared-illuminated video images to be reflected from the surrounding environment; and
a stereoscopic video camera device including
two cameras that each capture the reflected infrared-illuminated video images of the illuminated surrounding environment, wherein the surrounding environment to which the infrared light is illuminated includes at least an area in front of the stereoscopic video camera device, and a convergence/divergence angle between the two cameras is adjustable; and
a projection system that receives the infrared-illuminated video images from the two cameras, and projects (i) a first infrared-illuminated video image onto a transparent left eye viewport portion of the transparent display, the first infrared-illuminated video image overlapping the user's left eye field of vision, and concurrently, (ii) a second infrared-illuminated video image onto a transparent right eye viewport portion of the transparent display, the second infrared-illuminated video image overlapping the user's right eye field of vision, wherein projection of the first infrared-illuminated video image and the second infrared-illuminated video image onto the transparent display creates a stereoscopic image viewable by the user, and the projected video images are configured to be perceived as a three-dimensional image.

28. The wearable display glasses according to claim 27, wherein the convergence/divergence angle between the two cameras is manually adjustable by the user.

29. The wearable display glasses according to claim 27, wherein the convergence/divergence angle of the two cameras is automatically adjustable.

30. The wearable display glasses according to claim 27, wherein the convergence/divergence angle of the two cameras is configured to be automatically adjusted based on an expected focal distance of the user's eyes.

31. The wearable display glasses according to claim 27, wherein the two cameras are configured to have a relatively convergent angle for near sighted image viewing and a relatively divergent angle for far sighted image viewing.

32. The wearable display glasses according to claim 27, wherein each of the two cameras is positioned so that the first infrared-illuminated video image overlaps the second infrared-illuminated video image.

33. A display system for viewing video images of objects illuminated with infrared light, the display system comprising:

a wearable display including a transparent display that is positioned in a user's field of vision when the wearable display is worn;

an infrared light source that illuminates infrared light to a surrounding environment to cause infrared-illuminated video images to be reflected from the surrounding environment;

a stereoscopic video camera device including at least two cameras that each capture the reflected infrared-illuminated video images of the illuminated surrounding environment, the surrounding environment to which the infrared light is illuminated including at least an area in front of the stereoscopic video camera device; and a projection system mounted to the wearable display that receives the infrared-illuminated video image from the stereoscopic video camera device, and projects (i) a first infrared-illuminated video image onto a transparent left eye viewport portion of the transparent display, the first infrared-illuminated video image overlapping the user's left eye field of vision, and concurrently, (ii) a second infrared-illuminated video image onto a transparent right eye viewport portion of the transparent display, the second infrared-illuminated video image overlapping the user's right eye field of vision, wherein projection of the first infrared-illuminated video image and the second infrared-illuminated video image onto the transparent display creates a stereoscopic image viewable by the user.

34. The display system according to claim 33, wherein the stereoscopic video camera device wirelessly transmits the infrared-illuminated video images to the projection system.

35. The display system according to claim 33, wherein the stereoscopic video camera device is configured to be mounted to a mobile, remote-controlled device.

36. The display system according to claim 33, wherein the stereoscopic video camera device is configured to be mounted to an end portion of a telescoping rod.

37. The display system according to claim 33, wherein the stereoscopic video camera device is configured to be mounted to a hard hat.

38. The display system according to claim 37, wherein the infrared light source is configured to be mounted to the hard hat.

39. The display system according to claim 38, further comprising:

a belt that is disposed around the hard hat;
a bracket attachment that is fastened to the belt; and
a support device that is rotatably fixed to the bracket attachment, wherein
the stereoscopic video camera device is attached to one end of the support device, and the infrared light source is attached to another end of the support device.

40. The display system according to claim 39, wherein the support device is substantially bent at 90° so that a viewing angle of the stereoscopic video camera device and a viewing angle of the infrared light source are substantially the same.

41. The display system of claim 40, wherein
when the support device is rotated, the viewing angle of the stereoscopic video camera device and the viewing angle of the infrared light source remain substantially the same.

42. The display system of claim 39, further comprising a fastener that fastens the support device to the stereoscopic video camera device.

43. The display system of claim 39, wherein the belt encircles the hard hat and extends over the top of the hard hat.

44. The display system of claim 39, wherein
the bracket attachment increases a clamping force to fix the support device in place, and
the bracket attachment decreases a clamping force to rotate the support device.

* * * * *